United States Patent
Palmaro

(10) Patent No.: US 10,228,836 B2
(45) Date of Patent: Mar. 12, 2019

(54) SYSTEM AND METHOD FOR GENERATION OF 3D VIRTUAL OBJECTS

(71) Applicant: Unity IPR ApS, Copenhagen K (DK)

(72) Inventor: Gregory Lionel Xavier Jean Palmaro, Paris (FR)

(73) Assignee: Unity IPR ApS, Copenhagen K (DK)

( * ) Notice: Subject to any disclaimer, the term of this patent is extended or adjusted under 35 U.S.C. 154(b) by 0 days.

(21) Appl. No.: 15/603,311

(22) Filed: May 23, 2017

(65) Prior Publication Data

US 2017/0336951 A1 Nov. 23, 2017

Related U.S. Application Data

(60) Provisional application No. 62/340,288, filed on May 23, 2016.

(51) Int. Cl.
*G06F 3/01* (2006.01)
*A63F 13/12* (2006.01)
(Continued)

(52) U.S. Cl.
CPC .......... *G06F 3/04845* (2013.01); *A63F 13/53* (2014.09); *A63F 13/63* (2014.09); *G06F 1/163* (2013.01); *G06F 3/011* (2013.01); *G06F 3/0482* (2013.01); *G06F 3/04815* (2013.01); *G06F 3/04842* (2013.01); *G06T 19/20* (2013.01); *A63F 2300/6018* (2013.01);
(Continued)

(58) Field of Classification Search
CPC .... H04L 7/157; H04L 29/06034; A63F 13/12; A63F 2300/5553; G06F 3/04815; G06F 3/011
See application file for complete search history.

(56) References Cited

U.S. PATENT DOCUMENTS 5,870,090 A * 2/1999 Takai ................... G06F 3/04842
715/788
7,084,876 B1 * 8/2006 Fogel ..................... A63F 13/10
345/473
(Continued)

*Primary Examiner* — Doon Y Chow
*Assistant Examiner* — Le V Nguyen
(74) *Attorney, Agent, or Firm* — Schwegman Lundberg & Woessner, P.A.

(57) ABSTRACT

A system includes one or more hardware processors, a memory storing vosset data for a virtual object, the vosset data including a first displacement threshold and a first component, and a vosset module executable by the one or more hardware processors. The vosset module is configured to display the first component of the virtual object to a user in a virtual environment, display a manipulator object adjacent to the virtual object in the virtual environment, the manipulator identifies a pre-determined direction of displacement, detect a displacement event associated with the manipulator object, the displacement event being initiated by the user performing a grab event on the manipulator object and extending the manipulator object a displacement distance in the direction of displacement, determine that the displacement distance exceeds a displacement threshold, and alter the virtual object based on detecting the determining that the displacement distance exceeds the displacement threshold.

21 Claims, 21 Drawing Sheets
(13 of 21 Drawing Sheet(s) Filed in Color)

(51) Int. Cl.
    *A63F 13/53*         (2014.01)
    *A63F 13/63*         (2014.01)
    *A63F 13/60*         (2014.01)
    *G06F 3/0484*       (2013.01)
    *G06F 3/0482*       (2013.01)
    *G06F 3/0481*       (2013.01)
    *G06T 19/20*         (2011.01)
    *G06F 1/16*          (2006.01)

(52) U.S. Cl.
    CPC ....... *A63F 2300/66* (2013.01); *G06T 2200/24* (2013.01); *G06T 2210/04* (2013.01); *G06T 2219/2004* (2013.01)

(56) References Cited

U.S. PATENT DOCUMENTS

| | | | | |
|---|---|---|---|---|
| 8,302,074 | B1* | 10/2012 | Waldorf | G06F 17/3089 715/234 |
| 8,520,019 | B1* | 8/2013 | Freyhult | G06F 3/0481 345/581 |
| 2006/0238515 | A1* | 10/2006 | Ohshita | G06F 3/0481 345/173 |
| 2007/0070066 | A1* | 3/2007 | Bakhash | G06F 3/04815 345/419 |
| 2010/0149347 | A1* | 6/2010 | Kim | G06F 17/30047 348/207.1 |
| 2013/0055126 | A1* | 2/2013 | Jackson | G06F 3/04812 715/769 |
| 2016/0179336 | A1* | 6/2016 | Ambrus | G02B 27/017 715/768 |

* cited by examiner

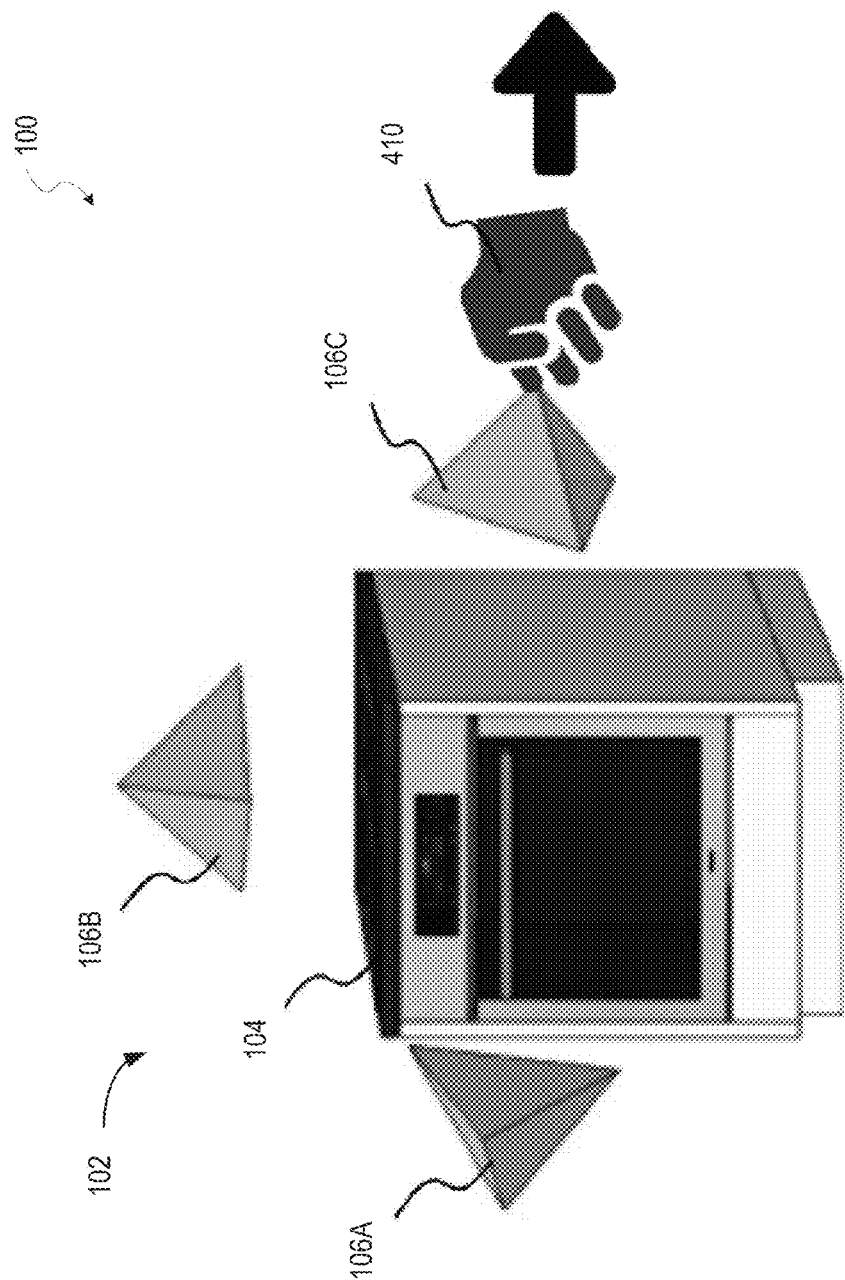

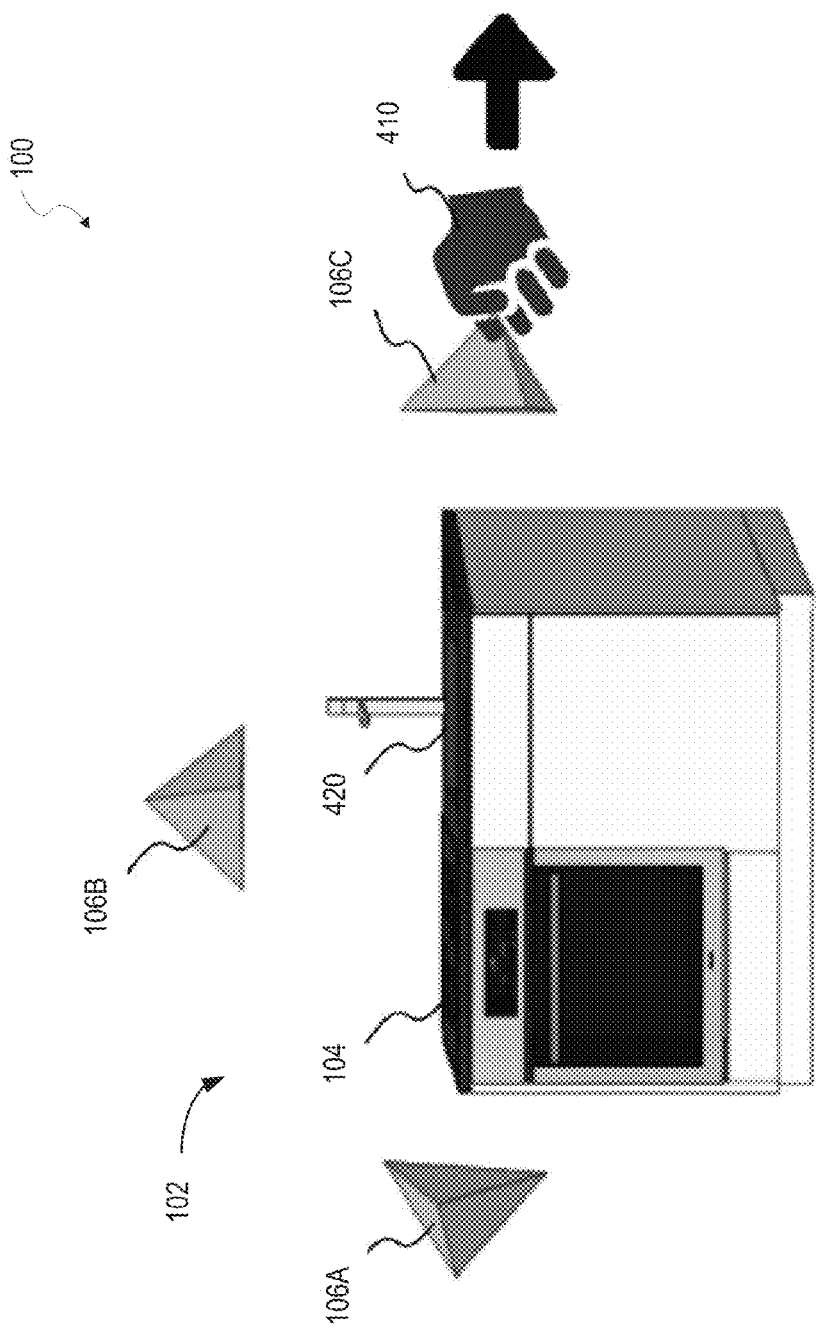

SYSTEM AND METHOD FOR GENERATION OF 3D VIRTUAL OBJECTS

RELATED APPLICATIONS

This application claims the benefit of priority to U.S. Provisional Patent Application Ser. No. 62/340,288, filed May 23, 2016, herein incorporated by reference in its entirety.

TECHNICAL FIELD

The present disclosure relates to the field of virtual reality and, more specifically, to systems and methods for providing software tools for use in creating and manipulating 3D virtual objects within virtual reality (VR) and augmented reality (AR) environments.

BACKGROUND

Various tools exist for the procedural creation of elements such as textures, characters and levels within games. There are many games where algorithms are used to create entire game levels, complete with characters, while a user is playing the game. This approach may reduce the amount of effort required for the creative aspects of game development (e.g., fewer assets may need to be created and shipped with games). These game levels may be created as needed on the fly. However, creators themselves may benefit from procedural methods of 3D virtual object creation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and cannot be considered as limiting its scope, and in which:

FIGS. 4A, 4B, 4C and 4D illustrate example operations performed on the original vosset in the virtual environment by the user using the manipulators;

The headings provided herein are merely for convenience and do not necessarily affect the scope or meaning of the terms used. Like numbers in the Figures indicate like components.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

The present disclosure provides tools that allow a user (e.g., a game creator) to simply create a variety of 3D virtual objects from within a virtual reality (VR) environment. The tools provide objects that can fill a space intelligently and quickly based in part on cues from the surroundings in which the objects are placed. This will reduce the amount of time needed for the creation of virtual objects, levels and worlds.

The disclosure described herein provides methods and systems for expanding 3D virtual objects within a virtual reality environment wherein the expansion is intelligent and can be a function of the surroundings. For example a desk can be expanded to fill an entire classroom in one move rather than using the copy and paste method. Consider, for example, a 3D object such as a sofa with 2 seats. In a basic 3D software transform, this sofa may change scale (e.g., size), but will remain a two seat couch. Conversely, with the methods described herein, the number of seats may increase when a user expands the couch, rather than merely the proportions. One benefit of the systems and methods described herein is to reduce the amount of time that creators spend on creating individual objects that, in some cases, add very little value.

The term volumetric asset, or "vosset," as used herein, refers to a 3D object that may be displayed in a virtual environment (e.g., VR or AR), and that may be manipulated (e.g., altered) within the virtual environment by the various mechanisms as provided by the systems and methods described herein.

Figure 1:
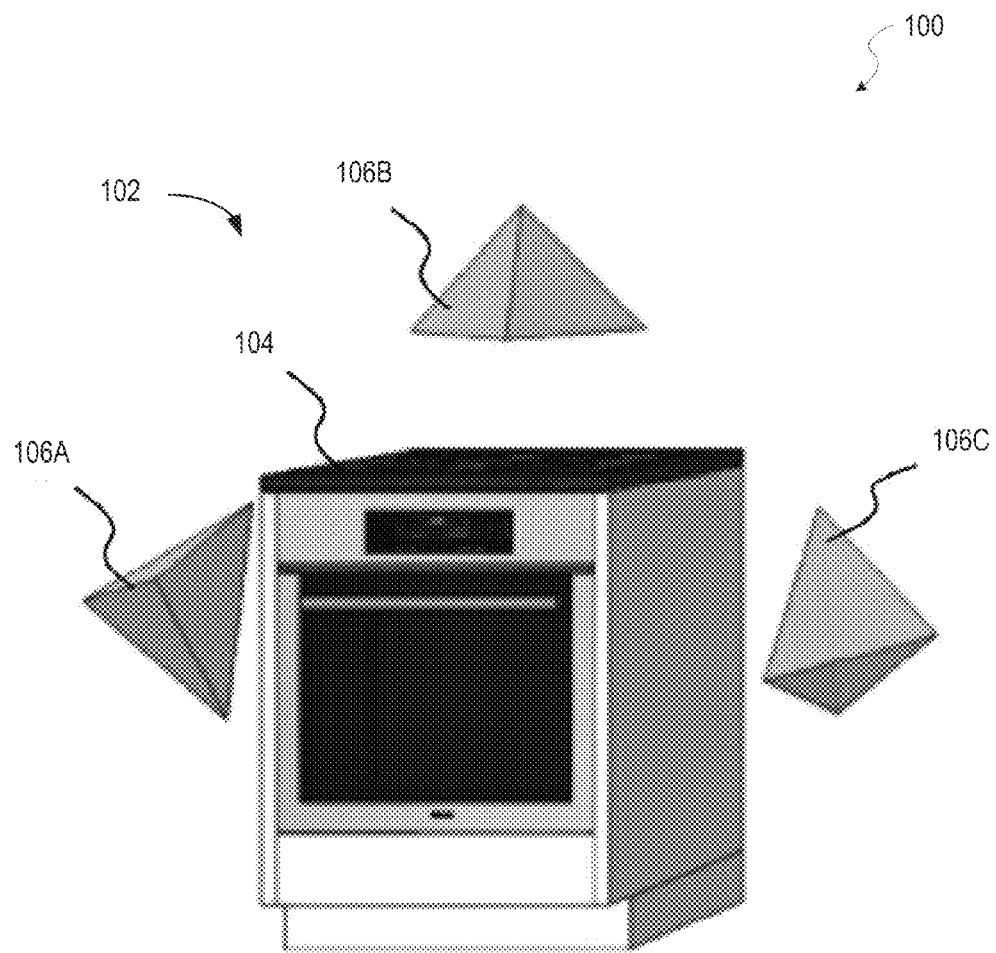
FIG. 1 is a diagram of an example virtual 3D object (a "vosset") displayed in a virtual environment.

FIG. 1 is a diagram of an example virtual 3D object ("vosset") 102 displayed in a virtual environment 100. In the example shown here, the vosset 102 initially begins with a single component 104, a typical kitchen oven. The vosset 102 also includes three manipulators 106A, 106B, 106C (collectively, manipulators 106). The first manipulator 106B appears above the vosset 102, the second manipulator 106C appears to the right of the object, and the third manipulator 106A appears to the left of the object. The manipulators 106, in the example embodiment, are pyramidal in shape, each having an apex oriented approximately outward from the vosset. In some embodiments, the vosset 102 may have manipulators 106 protruding along all six directions of motion. In some embodiments, some or all manipulators 106 may be displayed. The manipulators may be displaced along a direction of motion (e.g., axially, based on the orientation of the manipulators 106). In some embodiments, the manipulators may not be visible unless a vosset is selected or highlighted in some way (e.g., based on a gaze or focus of a user).

During operation, a user (not shown in FIG. 1) within the virtual reality environment 100 may interact with the vosset 102 via the manipulators 106. For example, during game creation, the user may experience the virtual reality environment by wearing a head mounted virtual reality display (or just head mounted display HMD, not shown in FIG. 1) and hand tracking devices (e.g., handheld tracking devices and optical tracking devices), and may manipulate the vosset 102 via interactions with the manipulators 106 (e.g., grabbing a manipulator 106 and pulling the manipulator 106 in a particular direction).

Figure 2:
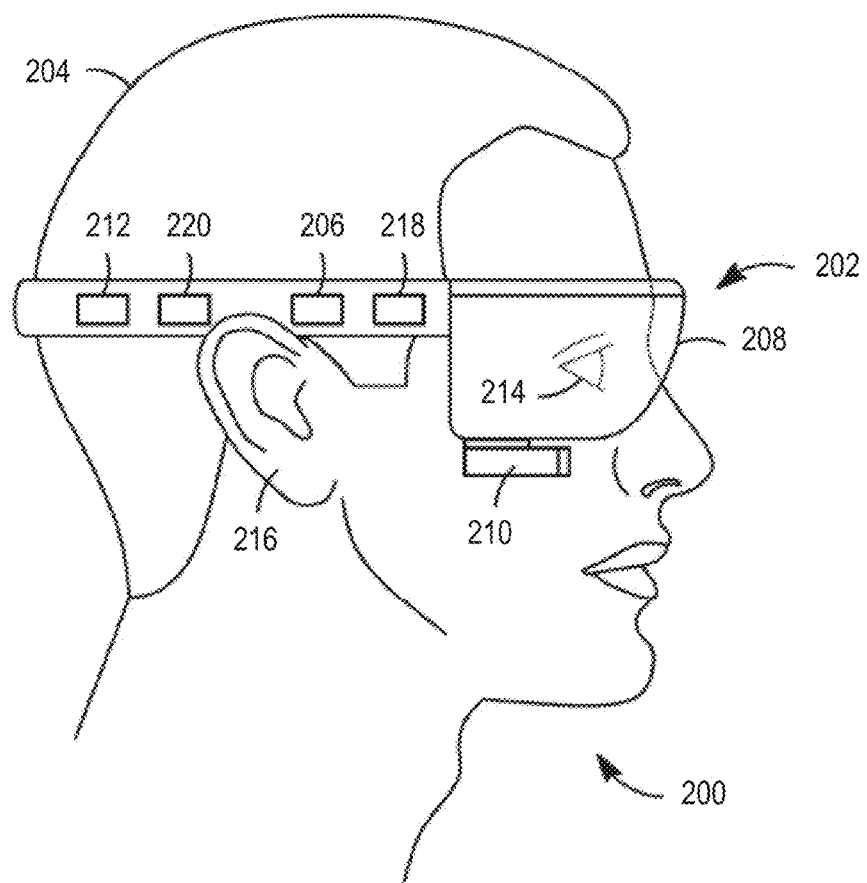
FIG. 2 is a diagram of an example head-mounted display (HMD), worn by a user (or "wearer")

FIG. 2 is a diagram of an example head-mounted display (HMD) 202, worn by a user (or "wearer") 200. In the example embodiment, the user 200 (e.g., a game developer) experiences a VR environment or AR content while wearing the HMD 202. The HMD 202 includes an opaque visor 208 which may obscure the wearer 200's view of the real world, and on which a complete virtual environment may be displayed. In other embodiments, the HMD 202 may include a transparent or semi-transparent visor (or "lens", or "lenses") 208 through which the wearer 200 views their surroundings (also herein referred to also as "the real world"). It should be understood that the visor 208 is illustrated in FIG. 2 as transparent for purposes of illustration but, as described above, the visor 208 may be transparent or semi-transparent in some embodiments (e.g., AR or mixed reality (MR), or opaque in others (e.g., VR).

In the example embodiment, the HMD 202 also includes a display device 218 that renders graphics (e.g., virtual objects, a virtual environment) onto the visor 208. As such, the visor 208 acts as a "screen" or surface on which the output of the display device 218 appears, and through which the wearer 200 experiences virtual content. The display device 218 is driven or controlled by one or more GPUs 206 or holographic processing units (HPUs). The GPU 206 processes aspects of graphical output that assists in speeding up the rendering of output through the display device 218.

In the example embodiment, the HMD 102 also includes one or more central processing units (CPUs) 220 that may execute some of the operations and methods described herein. The HMD 202 also includes an audio device 212 (e.g., speakers, not separately depicted) that is configured to present audio output to the wearer 200 (e.g., via ears 216 of the user 200). While not separately shown, the HMD 202 also includes wired or wireless network adapters (e.g., Wi-Fi, Bluetooth, cellular) that facilitate communication between the HMD 202 and other computing devices described herein.

In some embodiments, the HMD 202 includes one or more digital camera devices 210. In the example embodiment, the digital camera device (or just "camera") 210 is a forward-facing video input device that is oriented so as to capture at least a portion of a field of view (FOV) of the wearer 200. In other words, the camera 210 captures or "sees" an angle of view of the real world based on the orientation of the HMD 202 (e.g., similar to what the wearer 200 sees in the wearer 200's FOV when looking through the visor 208). The camera device 210 may be configured to capture real-world digital video around the user 200 (e.g., a field of view, a peripheral view, or a 360° view around the wearer 200). The camera device 210 may be used to capture digital video of the real world environment around the user 200. In some embodiments, output from the digital camera device 210 may be projected onto the visor 208 (e.g., in opaque visor embodiments), and may also include additional virtual content (e.g., added to the camera output). In some embodiments, the camera 210 may be a depth camera, or the HMD 202 may otherwise include a depth sensor, capturing depth information for objects within the FOV of the user 200.

In some embodiments, the HMD 202 may include one or more sensors (not separately shown), or may be coupled in wired or wireless communication with the sensors (e.g., via near-field communication (NFC) with a wrist-wearable device also worn by the wearer 200). For example, the HMD 202 may include motion or position sensors configured to determine a position or orientation of the HMD 202. In some embodiments, the HMD 202 may include a microphone for capturing audio input (e.g., spoken vocals of the user 200).

In some embodiments, the HMD 202 may be similar to virtual reality HMDs such as the Oculus Rift™, The HTC Vive™, The Playstation VR™, and the like. In some embodiments, the user 200 may hold one or more hand tracking devices ("handhelds") (not separately shown in FIG. 1) (e.g., one in each hand). The handhelds provide information about the absolute or relative position and orientation of a user's hands and, as such, are capable of capturing hand gesture information. The handhelds may be configured to operate directly with the HMD 202 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld.

In other embodiments, the user 200 may wear one or more wearable hand tracking devices (e.g., motion tracking gloves, not shown), such as those made commercially available by Manus VR (Netherlands). In still other embodiments, hand motion of the user 200 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position one or more of the hands of the user during operation.

During operation, in the example embodiment, the HMD 202 is mounted on a head 204 of the wearer, and over both eyes 114 of the wearer 100, as shown in FIG. 2. The wearer 200 may be presented with a virtual environment which may be viewed and edited via the HMD 202 and handhelds as described herein.

Figure 3:
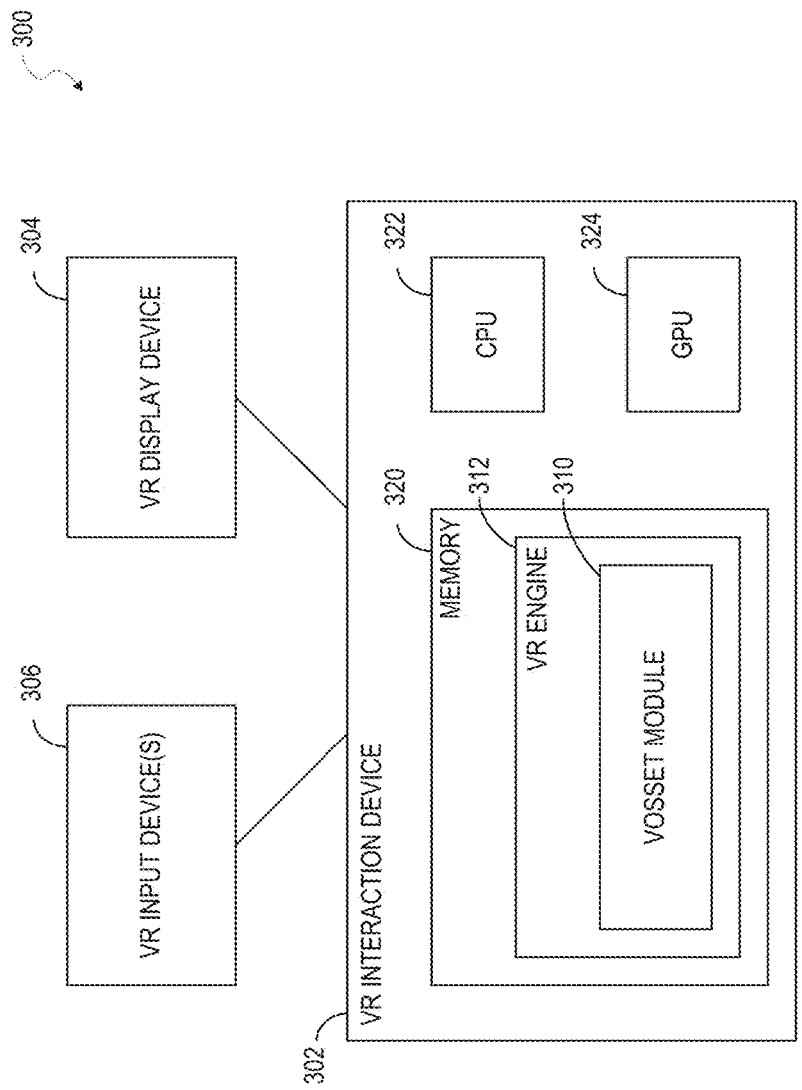
FIG. 3 is a component diagram of a VR interaction system that includes components similar to the HMD and the handhelds.

FIG. 3 is a component diagram of a VR interaction system 300 that includes components similar to the HMD 202 and the handhelds. In the example embodiment, the VR interaction system 300 includes a VR interaction device 302, a VR display device 304, and one or more VR input devices 306. In some embodiments, the VR display device 304 may be similar to the visor 208, and the VR input device(s) 306 may be similar to the handhelds or other tracking devices described above in reference to FIG. 2. In the example embodiment, the VR interaction device 302 includes a memory 320, one or more CPUs 322, and one or more GPUs 324 or HPUs. In some embodiments, the CPU 322 may be similar to the CPU 204, the GPU 324 may be similar to the GPU 206, and the VR interaction device 302 may be a part of the HMD 202. In some embodiments, the VR interaction system 300 and the various associated hardware and software components described herein may provide AR content instead of, or in addition to, VR content. It should be understood that the systems and methods described herein may be performed with AR content and, as such, the scope of this disclosure covers both AR and VR applications.

In the example embodiment, the VR interaction device 302 includes a VR engine 312, executed by the CPU 322 and/or GPU 324, that provides the VR environment 100 through the VR display device 304 (e.g., to the user 200). In some embodiments, the VR engine 312 is a game engine that is configured to produce VR content. The VR engine 312 includes a vosset module 310 that enables various aspects of vosset control actions for the user 200 within the VR environment 100 as described herein. The vosset module 310 may be implemented within, or communicate with, a larger more generic VR software application such as the VR engine 312 (e.g., a virtual reality editing application).

The vosset module 310 and the VR engine 312 include computer-executable instructions residing in the memory 320 that are executed by the CPU 322 and optionally with the GPU 324 during operation. The VR engine 312 communicates with the VR display device 304 (e.g., the HMD 202) and also with other VR hardware such as the VR input device(s) 306 (e.g., motion capture devices, such as handheld input devices). The vosset module 310 may be integrated directly within the VR engine 312, or may be implemented as an external piece of software (e.g., a plugin).

During operation, and in the example embodiment, the vosset module 310 performs the vosset manipulation operations described herein (e.g., with respect to the vosset 102) within the VR environment 100 (e.g., as rendered and displayed by the VR engine 312). More specifically, the vosset module 310 provides the manipulators 106 for the vosset 102 and the various operations performable by the user 200 via the manipulators 106 to alter the vosset 102.

FIGS. 4A, 4B, 4C and 4D illustrate example operations performed on the original vosset 102 in the virtual environment 100 by the user 200 using the manipulators 106. In the example embodiment, the vosset module 310 provides modular expansion functionality (e.g., component addition expansion events) for the vosset 102 to the user 200. Displacing one of the manipulators 106 of the vosset 102 causes the vosset 102 to expand into multiple additional components. In other words, the manipulators 106 enable the user 200 to expand the vosset by adding elements to the vosset 102 (e.g., additional components related to a theme of the object, such as kitchen cabinetry). The theme of the vosset 102 refers to a category (e.g., family, pool) of objects to which the vosset belongs (e.g., kitchen, living room furniture, tree).

For example, FIG. 4A depicts the vosset 102 initially with the single stovetop oven component 104 (e.g., one component of a kitchen themed virtual environment). While only a stovetop oven component 104 is illustrated in FIG. 4A, the vosset 102 is capable of expansion (e.g., adding additional components (e.g., other 3D objects) that are common in a kitchen setting). The other objects may include, for example, kitchen counters, kitchen appliances, kitchen cabinets, and the like. In the example embodiment, the user 200 is represented in the VR environment 100 by a disembodied virtual hand 410. Displacing the manipulator 106C (e.g., by pulling outward to the right on the manipulator 106C, away from the vosset 102) causes the original vosset 102 to expand sideways and add new modular components.

Figure 4C:
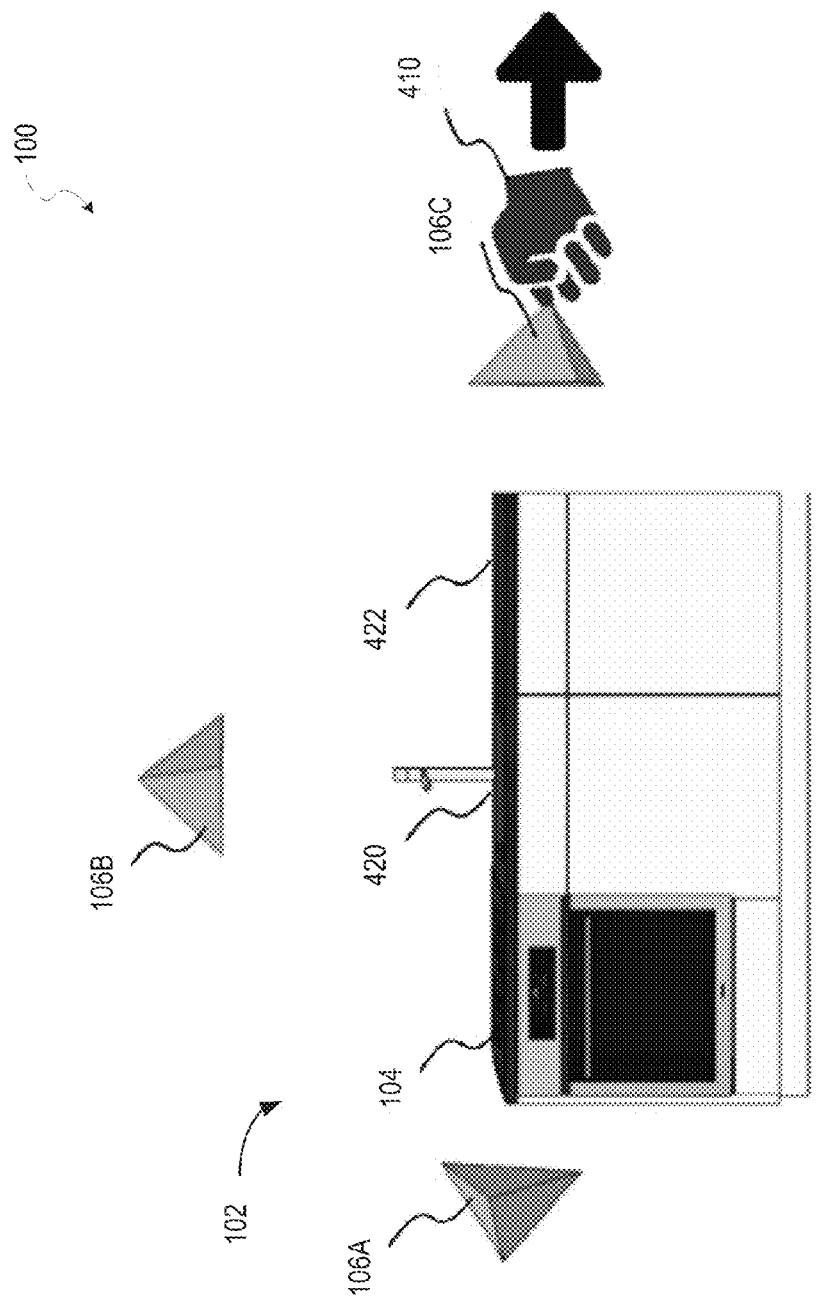
Figure 4D:
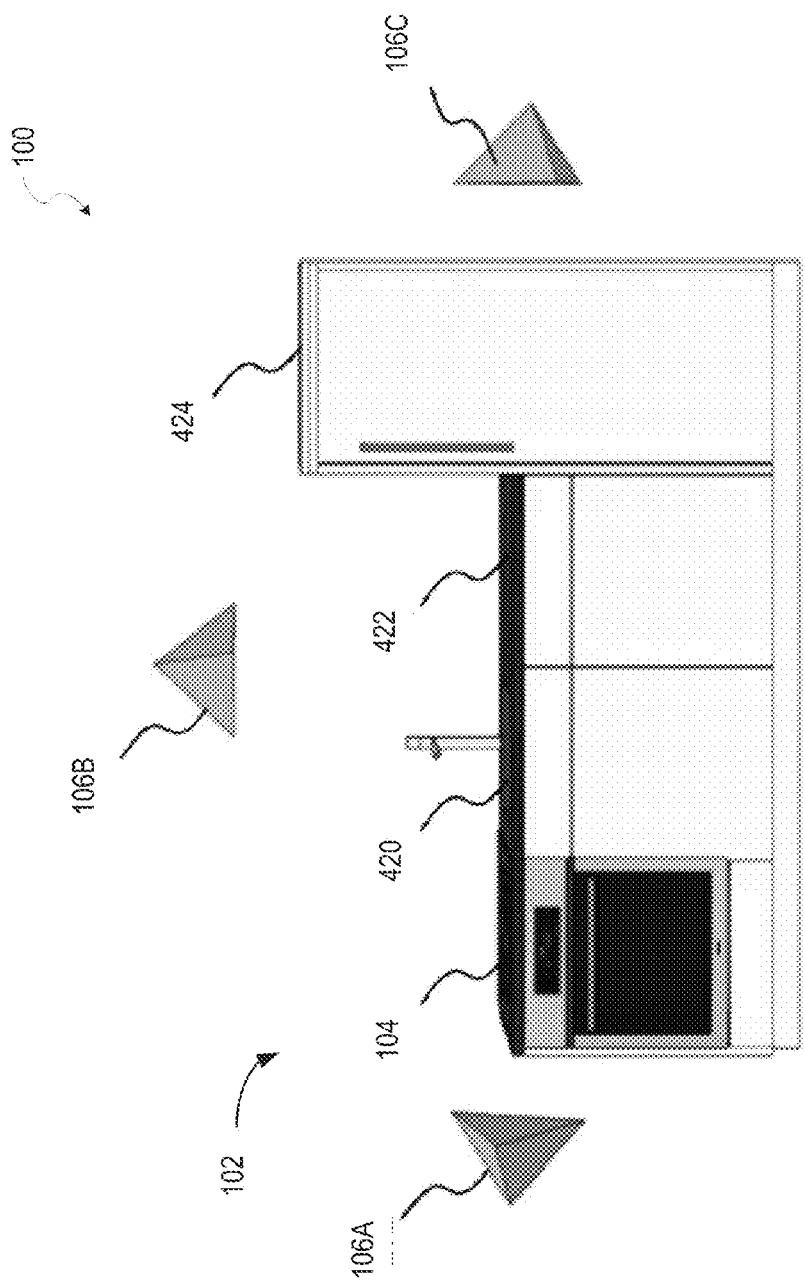

FIGS. 4B, 4C and 4D illustrate multiple expansions of the vosset 102 as the user 200 pulls on the manipulator 106C, displacing it to the right of the vosset 102 (e.g., in the direction defined by the pyramid apex of the manipulator 106C). As the hand 410 displaces the manipulator 106C, the manipulator 106C moves sideways. Once the manipulator 106C has been moved past a decision point (e.g., a predetermined distance), a new component 420 (e.g. a counter with a sink) is added to the right of the vosset 102, as seen in FIG. 4B. This movement of the manipulator 106C past the decision point triggers an expansion event, causing the vosset module 310 to add a new component. In some embodiments, the pre-determined distance may be based on a dimension of the component to be added (e.g., the width of the counter with sink component 420).

Continuing the example, as the user 200 continues to displace the manipulator 106C past a second decision point, another new component 422 (e.g., a flat kitchen counter and cabinet) is added next to the sink component 420, as shown in FIG. 4C. As the user 200 continues to displace the manipulator 106C past a third decision point, another new component 424 (e.g., a refrigerator) is added next to the counter 422, as shown in FIG. 4D.

Figure 5A:
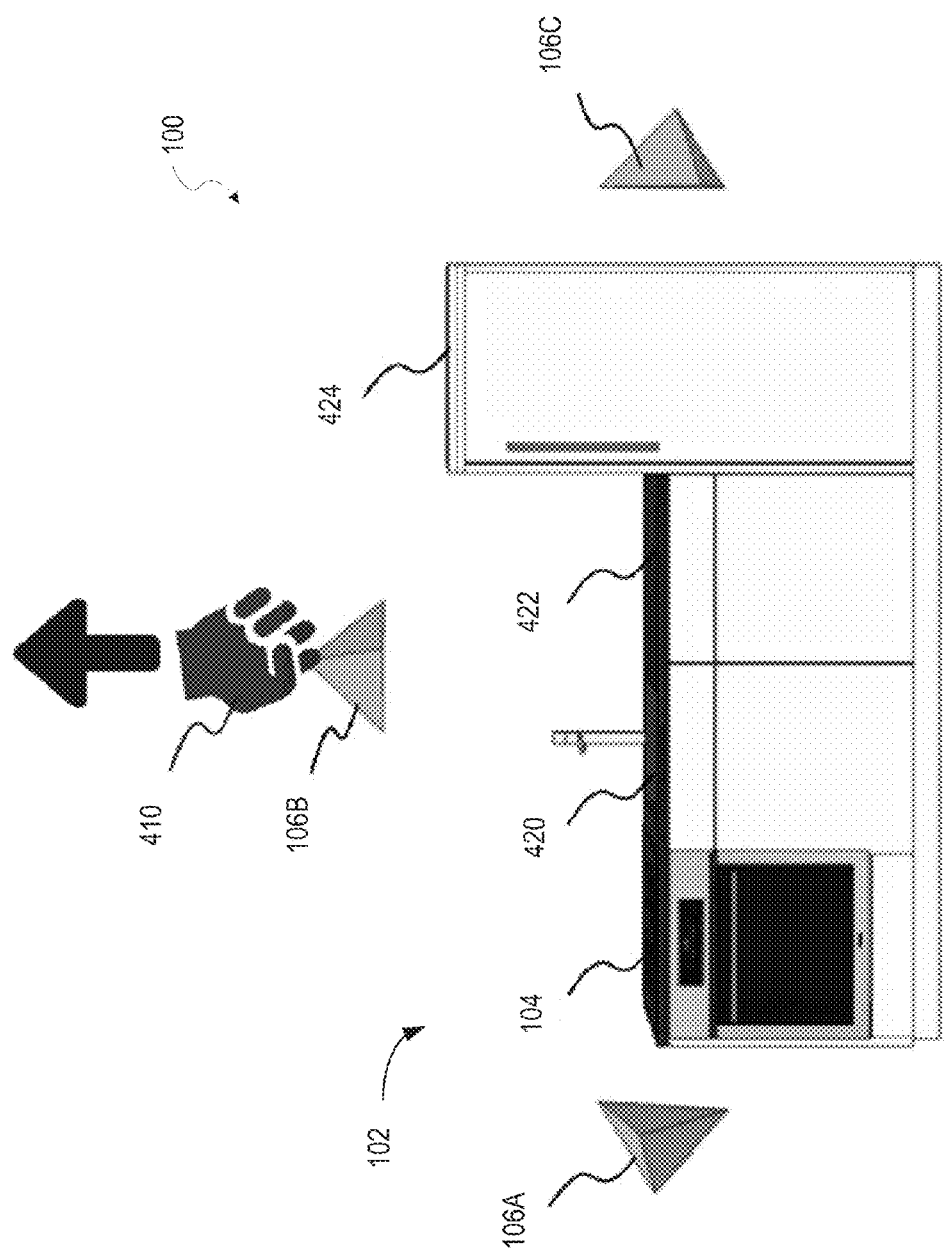
FIGS. 5A, 5B, and 5C illustrate the vosset being expanded in a second direction (e.g., after being expanded as shown in FIGS. 4A-4D)
Figure 5B:
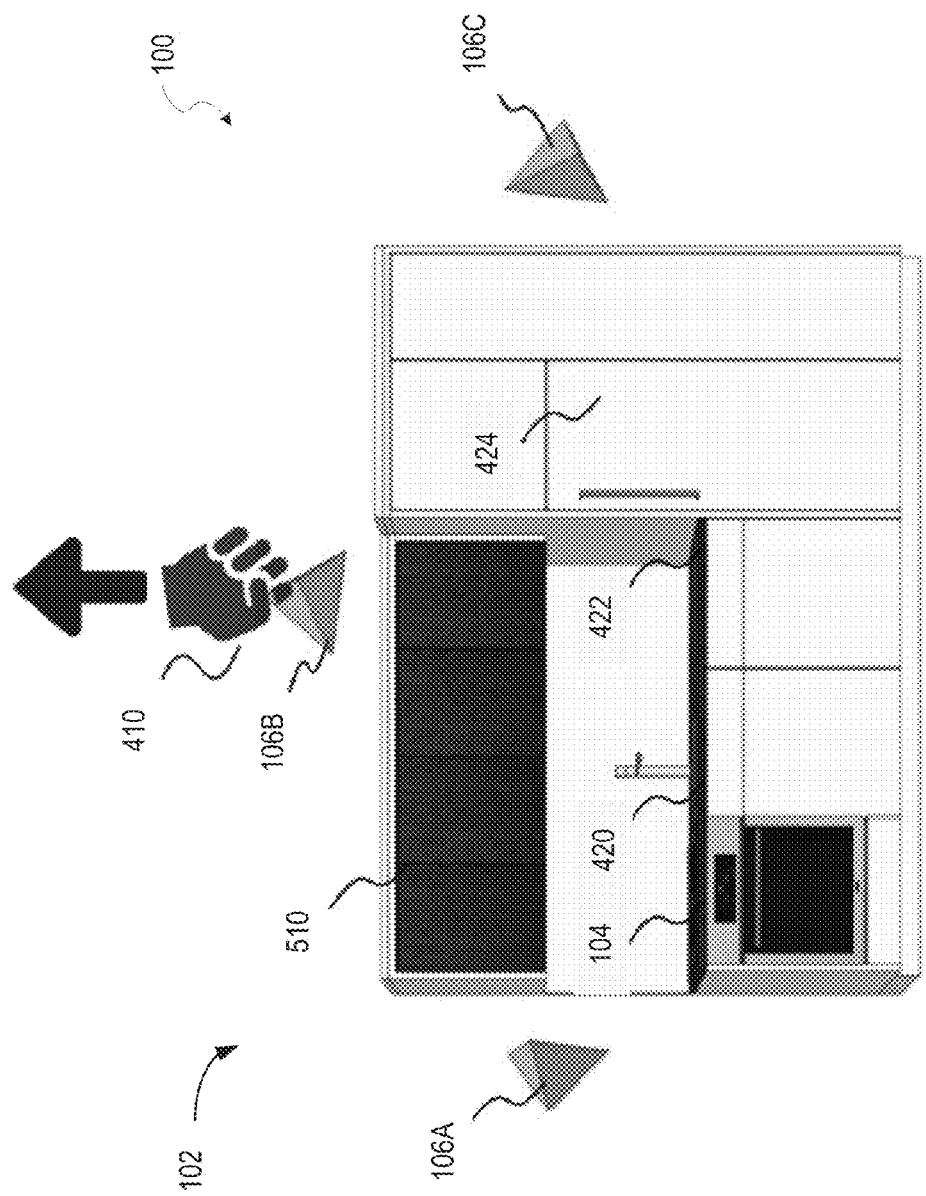
Figure 5C:
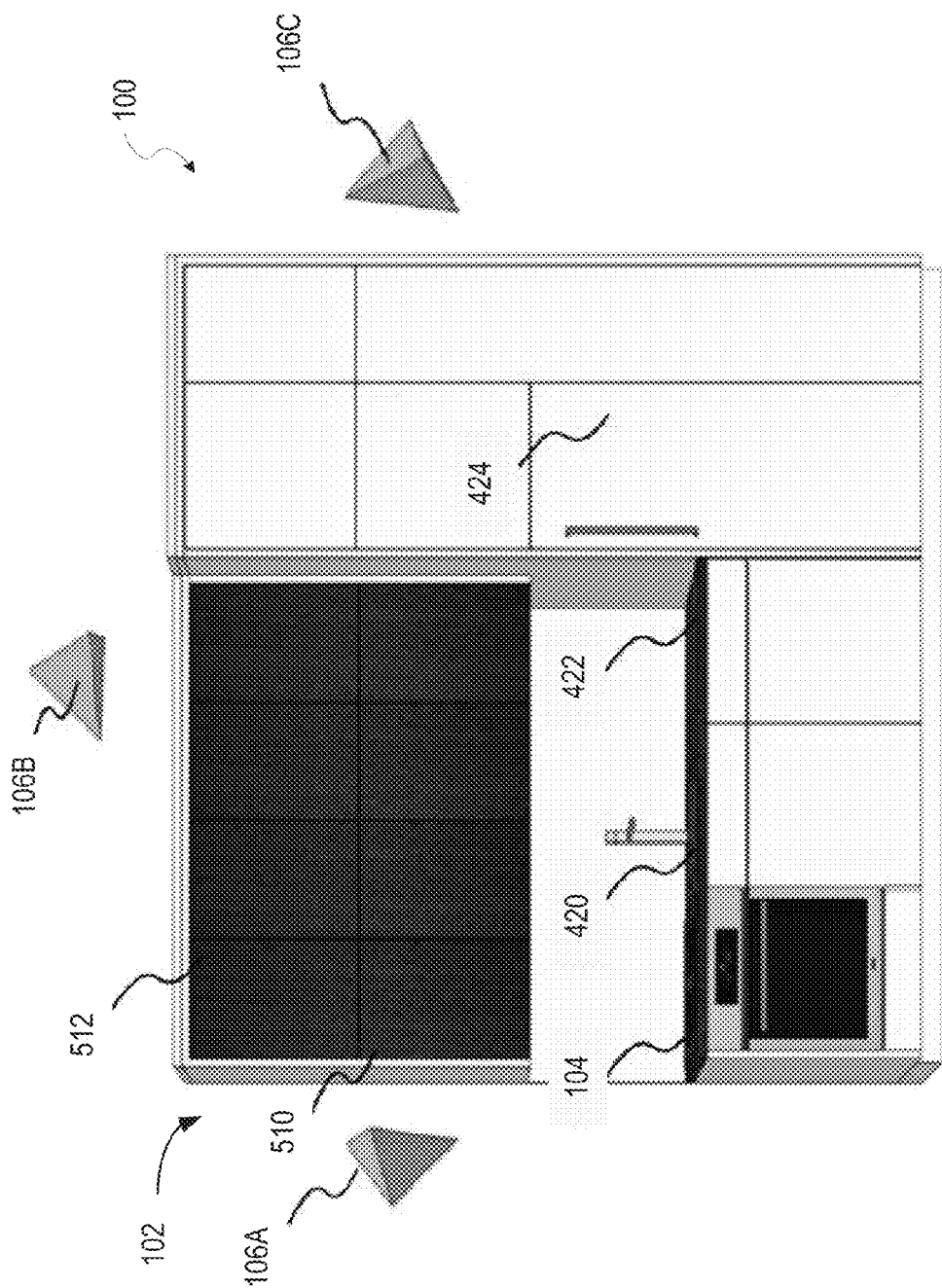

FIGS. 5A, 5B, and 5C illustrate the vosset 102 being expanded in a second direction (e.g., after being expanded as shown in FIGS. 4A-4D). Continuing the example from FIG. 4A-4D, and in the example embodiment, the user hand 410 now pulls in an upward direction on the manipulator 106B. As shown in FIG. 5B, once the hand 410 has pulled the manipulator 106B past another decision point, the vosset 102 expands in the vertical direction by adding a new level 510 of components above the existing components 104, 420, 422, 424 (e.g., dark-colored cabinets and white cabinets). As shown in FIG. 5C, the user hand 410 continues to pull upward on the manipulator 106B. After the manipulator 106B has been pulled past another decision point, the vosset 102 expands again in the vertical direction by adding a second new level 512 of components above the first new level 510. In this example the second new level 512 is approximately identical to the first new level.

In some embodiments, the vosset module 310 enables the user 200 to push the manipulator towards the vosset 102, rather than away from it. When one of the manipulators 104 is displaced towards the vosset 102, the components of the vosset 102 are retracted (e.g., undone in reverse order from the order they appeared when the manipulator was displaced away from the vosset 102). For example, the user 200 may push down on the manipulator 106B, as shown in FIG. 5C, and the vosset module 310 retracts from a 3 level kitchen back to a 1 level kitchen vosset 102.

Figure 6:
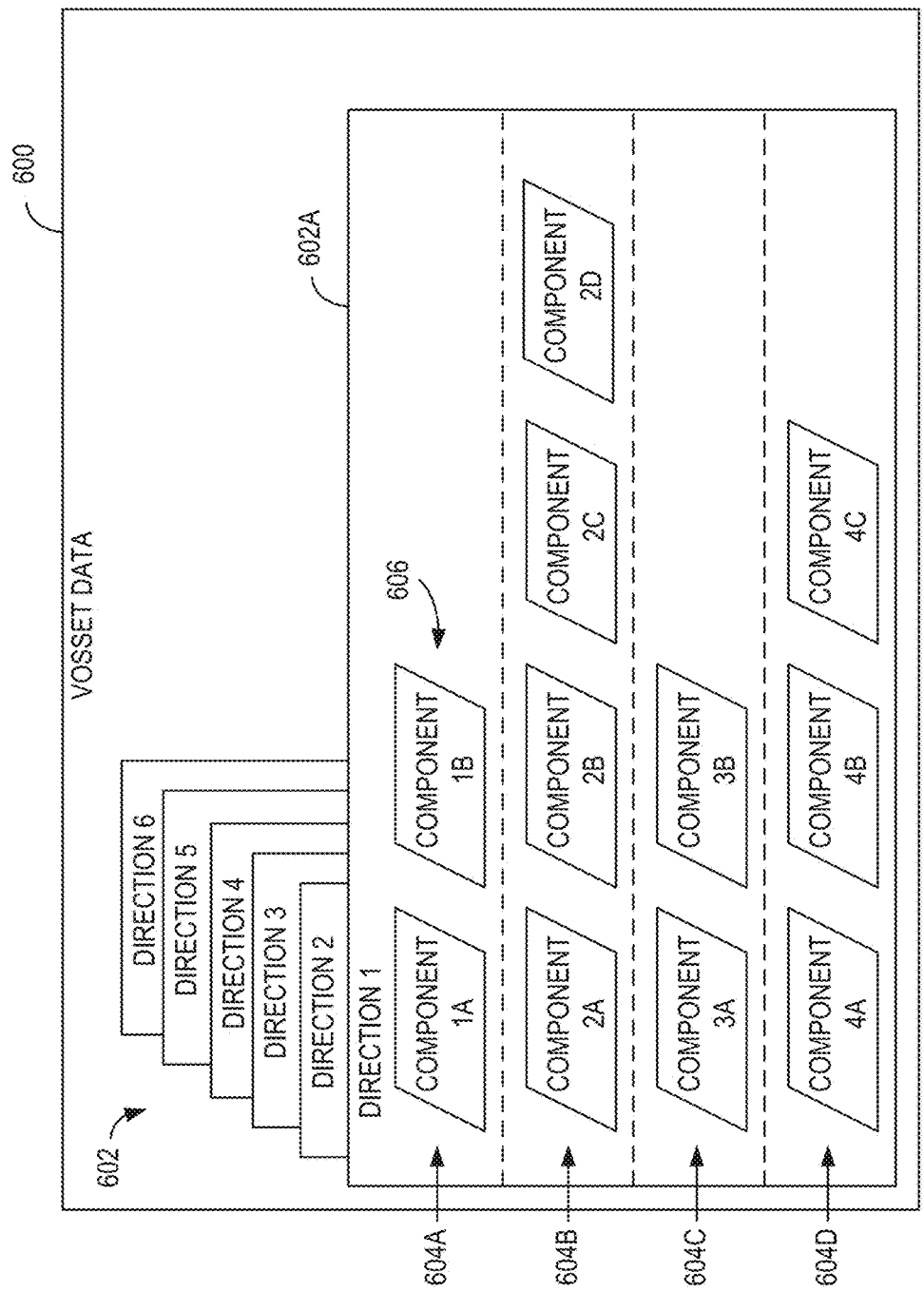
FIG. 6 is a data diagram illustrating some elements of vosset data associated with the vosset.

FIG. 6 is a data diagram illustrating some elements of vosset data 600 associated with the vosset 102. In the example embodiment, vosset data 600 includes six direction elements 602, and each direction element 602 corresponds to a pre-defined direction of motion of a particular manipulator 106 (e.g., a vector 3-dimensional space). For example, the "Direction 1" direction element 602 may be associated with the manipulator 106C (e.g., vosset expansion to the right), the "Direction 2" direction element 602 may be associated with the manipulator 106B (e.g., vosset expansion upward), and the "Direction 3" direction element 602 may be associated with the manipulator 106A (e.g., vosset expansion to the left). While six direction elements 602 are shown in FIG. 6, it should be understood that any number of direction elements 602 may be used.

Each direction element 602 may include one or more component sets 604. In the example embodiment, the "Direction 1" direction element 602A includes component sets 604A, 604B, 604C, and 604D (collectively, component sets 604). Each component set 604 includes or otherwise identifies multiple components 606 and associated data. The component sets 604 identify a set of components 606 which may be used for expansion in particular situations. In other words, a particular component set 604 identifies the types of components that may be used during particular expansion events. The associated component data for components 606 includes 3D object data, or references thereto, used to create, animate and render a 3D virtual object.

For example, a particular component set 604B may include components 606 used in the expansion event involving manipulator 106C as illustrated in FIGS. 4A-4D. More specifically, the component set 604B may include a "Component 2A" of the oven component 104, and a "Component 2B" of the sink component 420), and a "Component 2C" of the counter component 422, and a "Component 2D" of the refrigerator component 424. During the expansion event involving the manipulator 106C, the vosset module 310 identifies which component set 604 to use in the expansion (e.g., component set 604B), as well as which component 606 from the component set 604B to use in the expansion.

In some embodiments, the vosset module 310 may select the expansion component 606 randomly from the component set 604. In other embodiments, the vosset module 310 may select the expansion component 606 based on a pre-determined order of the components 606 within the set 604, and optionally based on the most recently added component. In some embodiments, the vosset data 600 may include a decision tree identifying how to add components 606. In some embodiments, certain transitions may be restricted (e.g., not allowing two stoves to be placed next to each other).

Figure 7A:
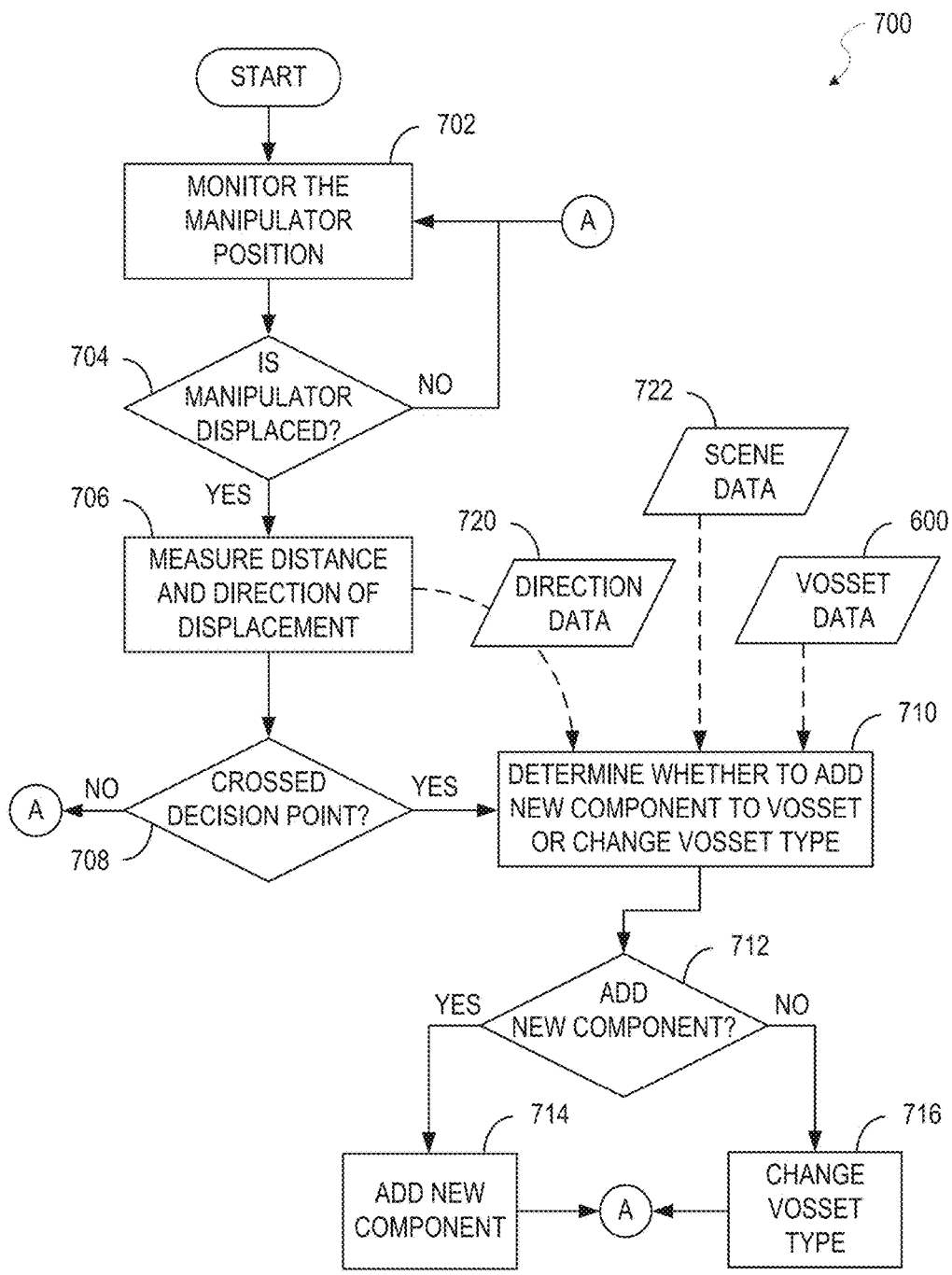
FIG. 7A is a flowchart of a method for providing displacement gesture mechanics for the vosset (e.g., for the expansion events illustrated in FIGS. 4A-5C) as performed by the vosset module.

FIG. 7A is a flowchart of a method 600 for providing displacement gesture mechanics for the vosset 102 (e.g., for the expansion events illustrated in FIGS. 4A-5C) as performed by the vosset module 310. In the example embodiment, the method 700 applies to each object manipulator 106. The position of each manipulator 106 is monitored to see whether that manipulator 106 is being displaced along its pre-determined direction of motion (see operation 702). If the manipulator 106 is determined to be displaced at operation 704, then the distance and direction of the displacement are measured at operation 706. The position of the manipulator 106 is compared to the position of a decision point at operation 708.

In the example embodiment, if the displacement of the manipulator 106 is less than the distance of the decision point, then no expansion action is taken and the vosset module 310 continues to monitor the position of the manipulator 106. If the manipulator 106 is displaced farther than the decision point, then the vosset module 310 determines whether to add a new component or to change vosset type (see operation 610).

To make the determination at operation 710, vosset data 600, direction data 720, and scene data 722 are captured. Vosset data 600 includes, for example, the type of vosset 102, how the vosset 102 expands in various directions (e.g., directions 602), and displacement thresholds for manipulators 106 of the vosset 102. Direction data 720 includes the distance and direction of displacement of the manipulator 106, and which manipulator 106 was displaced. Scene data 722 includes data about the environment 100 surrounding the vosset 102 (e.g., other 3D objects that may be used to limit or tailor the expansion possibilities for the vosset 102). If, at test 712, a new component 606 is to be added, then a new component 606 is added at operation 714, and the vosset module 310 returns to operation 702. If, at test 712, the vosset is to change type, then the vosset type change is performed by the vosset module 310 at operation 716, and the vosset module 310 returns to operation 702.

Figure 7B:
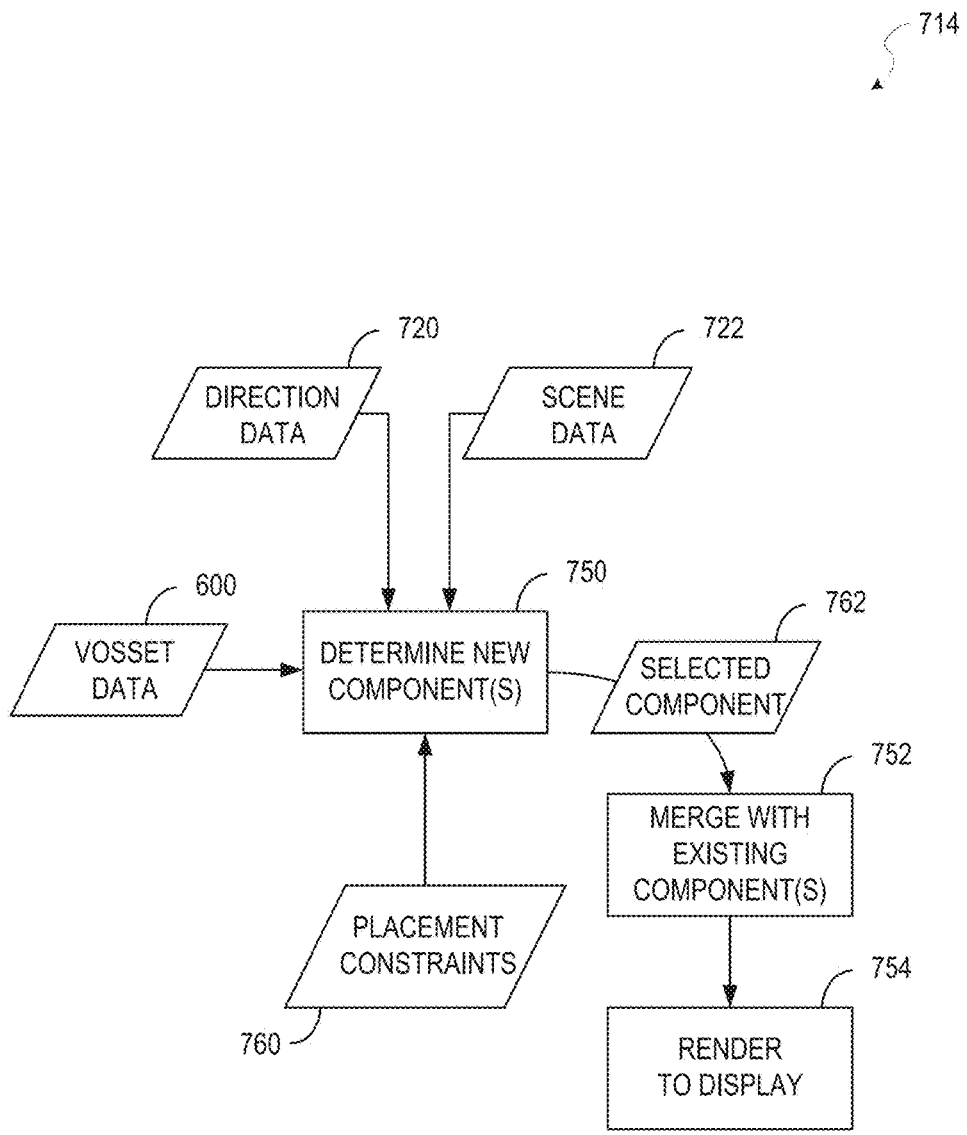
FIG. 7B illustrates an example flow chart for operation, adding a new component.

FIG. 7B illustrates an example flow chart for operation 714, adding a new component. In the example embodiment, operation 714 includes a modular expansion event on the vosset 102 (e.g., as described and shown in FIG. 4A-5C). At operation 750, the vosset module 310 determines which component 606 to add to the vosset 102 (e.g., in response to the displacement of one of the manipulators 106). The vosset module 310 uses the vosset data 600, the direction data 720, the scene data 722, and any available placement constraints 760 for the placement of components 606 in order to make the determination of which component 606 to add to the vosset 102.

In the example embodiment, at operation 750, the vosset module 310 determines a "selected component" 762 (e.g., one of the components 606 from one of the pools 604). At operation 752, the vosset module 310 merges components of the current vosset 102 with the selected component 762 (e.g., using 3D object merging methodologies). The result of the merging at operation 752 is then rendered to the display device 304 at operation 754, thereby displaying the expanded vosset 102 for the user 200.

Figure 8B:
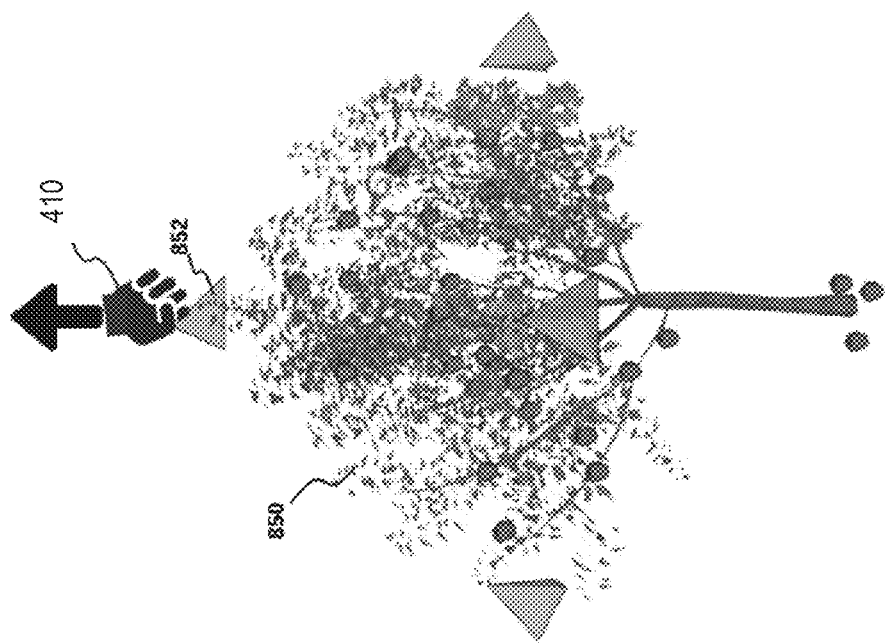
FIGS. 8A, 8B and 8C illustrate example replacement operations (e.g., replacement expansion events) performed on a vosset (e.g., a tree) in the virtual environment by the user using a manipulator.
Figure 8A:
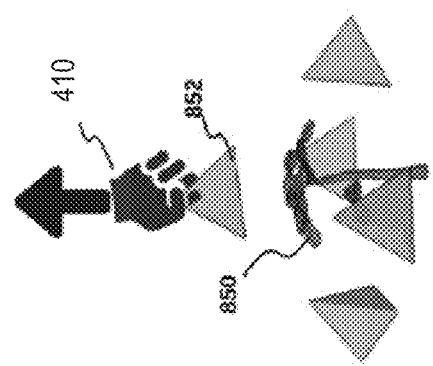
Figure 8C:
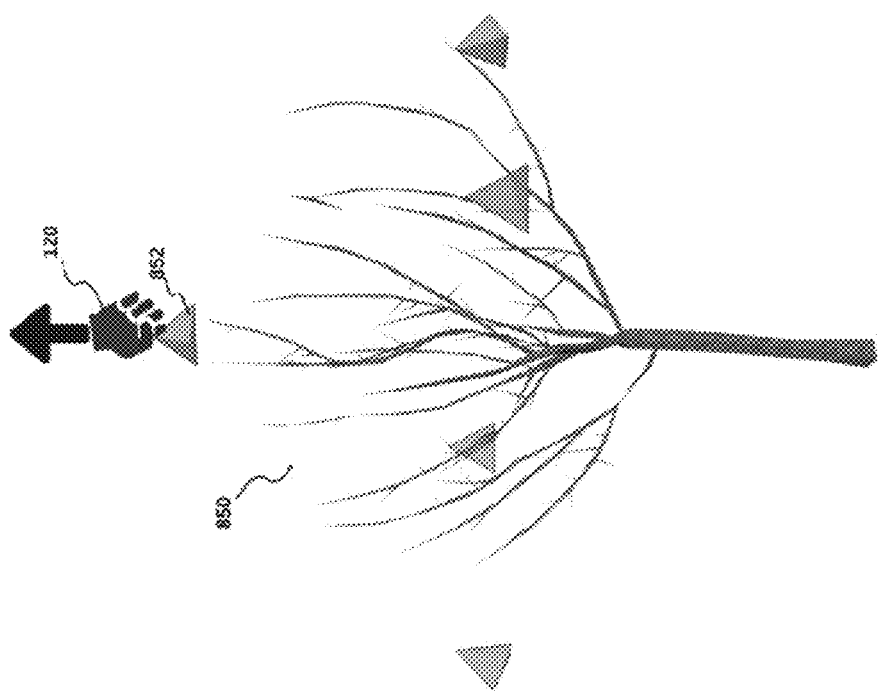

FIGS. 8A, 8B, and 8C illustrate example replacement operations (e.g., replacement expansion events) performed on a vosset 850 (e.g., a tree) in the virtual environment 100 by the user 200 using a manipulator 852. In the example embodiment, the vosset module 310 provides replacement expansion functionality for the vosset 850 to the user 200. Displacing the manipulators 852 of the vosset 850 causes the vosset 850 to replace one or more of the 3D objects used for the vosset 850 with other 3D objects somehow related to each other. In other words, the manipulators 852 enable the user 200 to alter the vosset 850 by replacing 3D objects within the vosset 850. The theme of the vosset 850 refers to the category (e.g., family, pool) of objects to which the vosset 850 belongs (e.g., kitchen, living room furniture, tree).

FIG. 8A illustrates the vosset 850 as a young sapling tree, with manipulators 852 in multiple directions. In the example, a user hand 410 displaces one of the manipulators 852 (e.g., the manipulator above the vosset 850) in an upward direction. As the manipulator 852 passes a decision point, the vosset module 310 replaces the sapling 3D object in the vosset 850 with an older, fuller tree, complete with apples, as shown in FIG. 8B. In the example embodiment, the tree has not simply grown in dimension, but rather it has been replaced from a sapling with only a few branches, leaves and no apples to a much larger and complex tree with many branches, leaves and apples. If the user 200 continues to displace the manipulator 852, the tree will be replaced again, as shown in FIG. 8C, with a barren tree (e.g., leafless and without apples). The replacement expansion event for the vosset 850 provides a natural evolution of the underlying object from a young sapling to an old, leafless tree.

In some embodiments, the vosset 850 may contain vosset data similar to the vosset data 600. For example, the components 606 of a particular direction (e.g., the up direction manipulator 852) may be ordered such that, as the manipulator 852 passes a decision point, the previous component is replaced with the next component based on the ordered components 606. In other words, each component 606 may have one or two neighbors, and the ordering defines the replacement component 606 based on the direction of the expansion event.

In some embodiments, the vosset module 310 enables an undo mechanism whereby the user pushes the manipulator 852 towards the vosset 850. When the manipulator 852 is displaced towards the vosset 850, one or more 3D objects of the vosset 850 are replaced in reverse order from the order presented when the manipulator 852 is displaced away from the vosset 850. Continuing with the example shown in FIGS. 8A, 8B and 8C, the vosset 852 changes from a leafless tree to a full tree to a sapling when the manipulator 852 is pushed back towards the vosset 850.

Figure 9A:
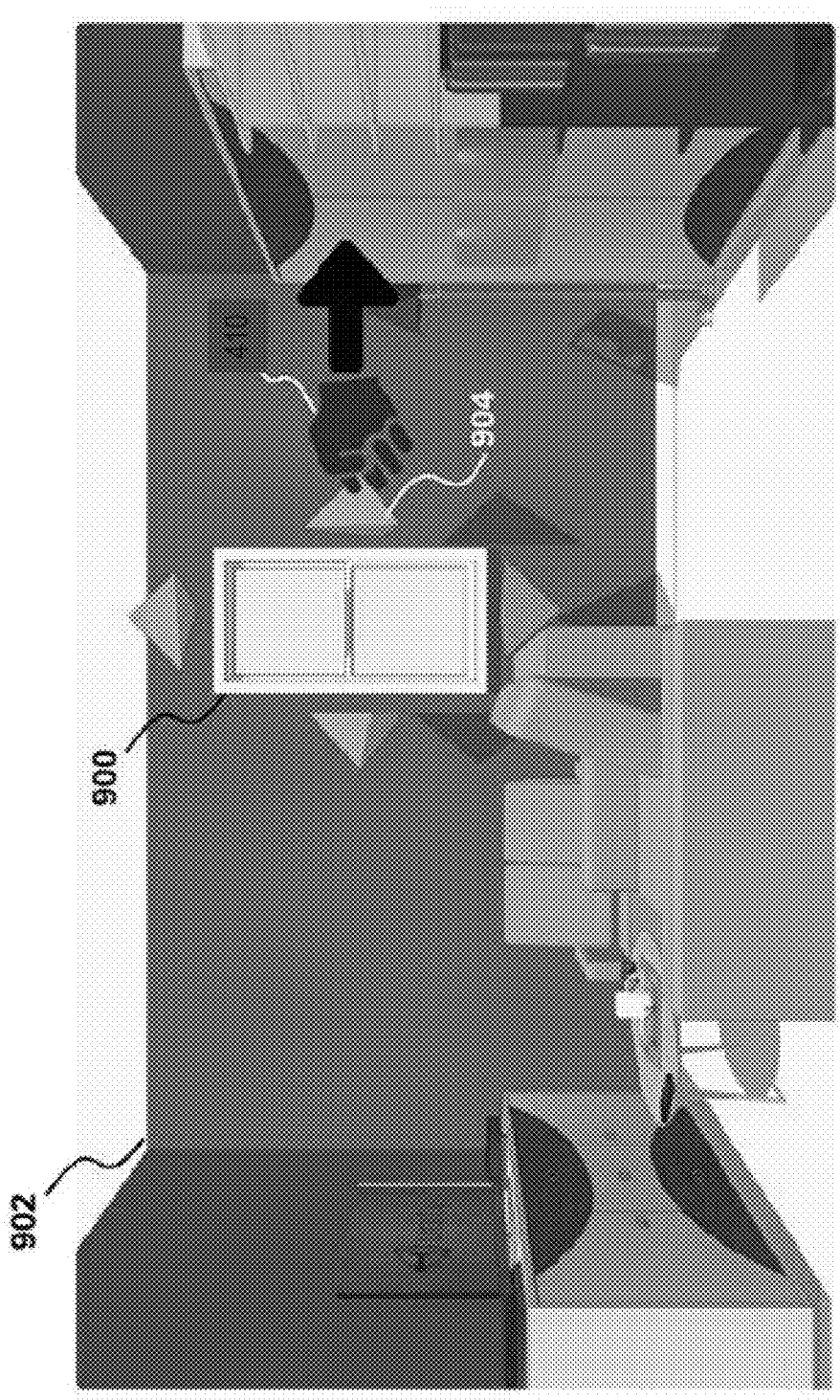
FIGS. 9A, 9B and 9C illustrate an example vosset having manipulators that provide both modular expansion and replacement expansion.
Figure 9B:
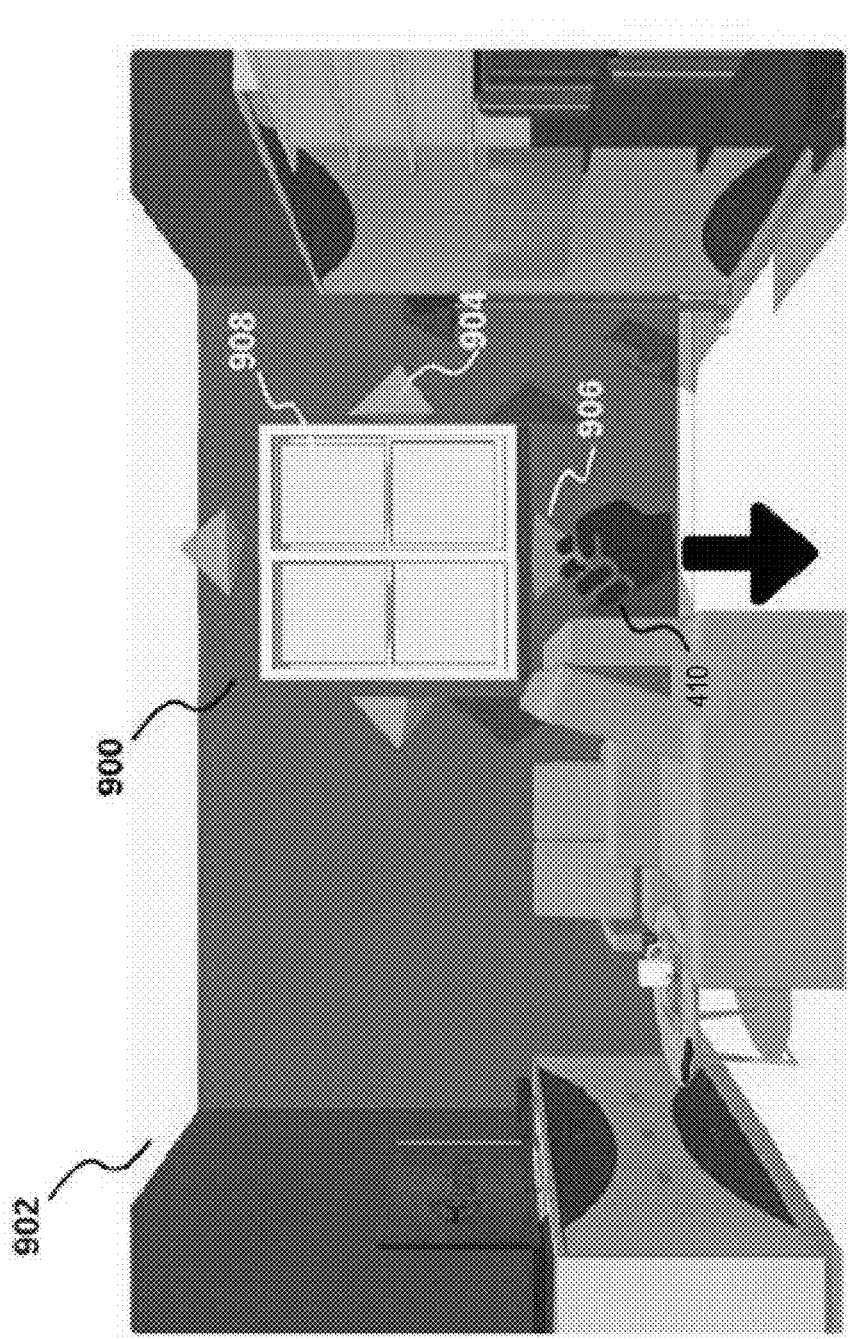
Figure 9C:
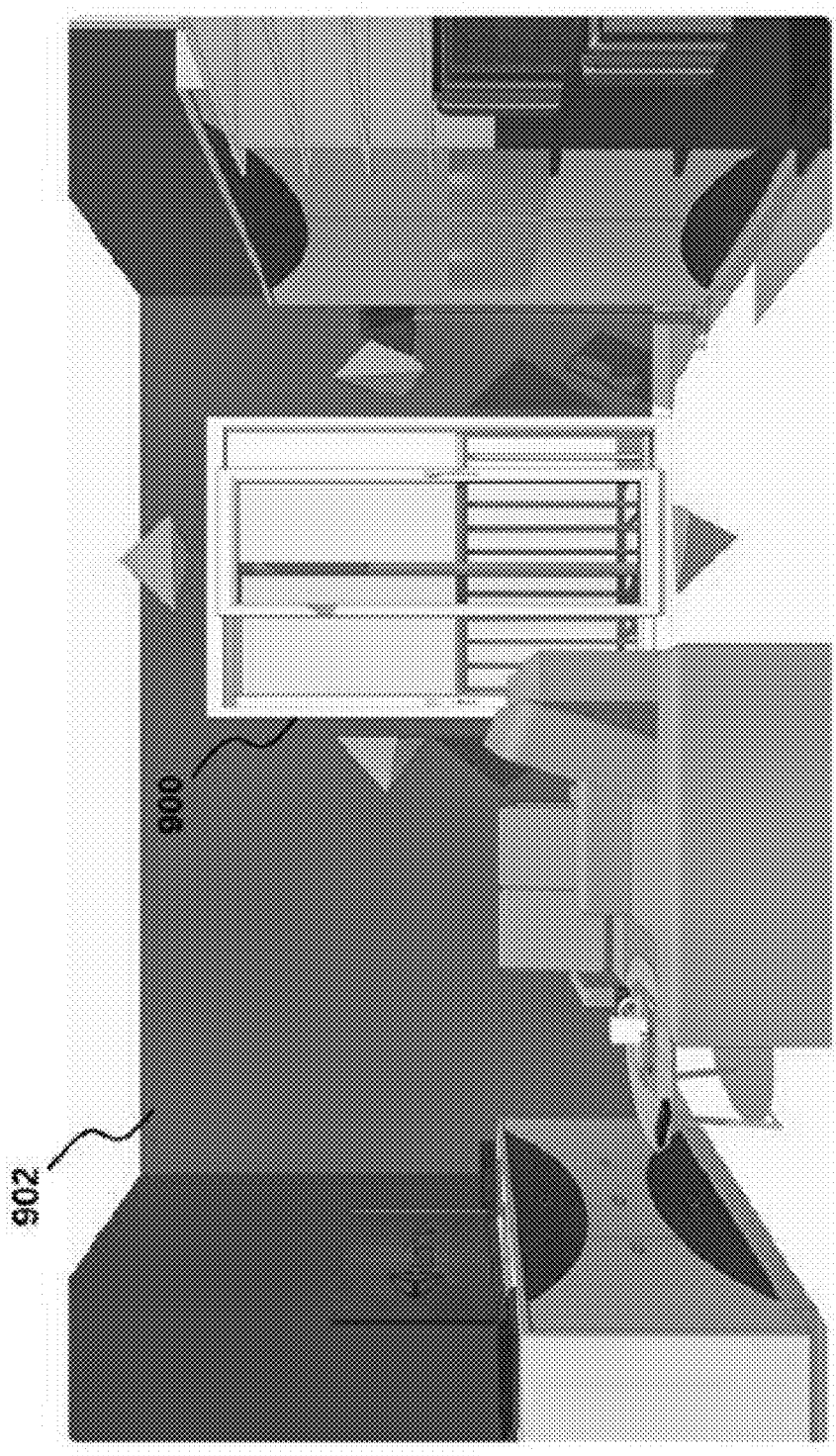

FIGS. 9A, 9B and 9C illustrate an example vosset 900 having manipulators 904, 906 that provide both modular expansion and replacement expansion. In the example embodiment, the vosset 900 (e.g., initially, a window) appears on a virtual wall 902 of a virtual living room. The vosset 900 is approximately centrally positioned on the wall 902 and appears to be several feet above the floor. The user hand 410 displaces the manipulator 904 horizontally to the right. As the user hand 410 displaces the manipulator 904 past a decision point to the right of the vosset 900, a second window component 908 is added to the vosset 900 (e.g., a modular expansion event), as shown in FIG. 9B.

Next, the user hand 410 displaces the manipulator 906, located below the window, vertically downward, as shown in FIG. 9B. As the user hand 410 displaces the manipulator 906 past a decision point below the vosset 900, the vosset 900 is replaced from a window to a sliding glass door and merges with the floor, as shown in FIG. 9C.

The example shown in FIGS. 9A-9C illustrate that, in some situations, the vosset module 310 adds elements to the vosset 900, while in other situations, the vosset module 310 replaces 3D objects of the vosset. The vosset module 310 (e.g., at operation 614) may determine which expansion to perform, for example, based on how the vosset 900 is configured, the surroundings around the vosset 900, and other data described herein. For example, in some embodiments, the distinction may depend in part on the surroundings (e.g., the floor below the window may cause the window to transform into a patio door upon an expansion event that reaches the floor).

The example given in FIGS. 9A, 9B and 9C shows the two modes (e.g., vosset types) of vosset changes (e.g., modular expansion and replacement expansion) happen when different manipulators are displaced. In some embodiments, a vosset 900 can be in a single mode (e.g., modular expansion) for all manipulators 904 at the same time, and then switch to the other mode (e.g., replacement expansion) using a switching mechanisms (e.g., holding the control key, or flipping a software switch). In other embodiments, a single manipulator 904 may provide mixed modes (e.g., modular expansion at a first decision point, and replacement at a second decision point). In some embodiments, the mode may be switched based on the virtual environment and the surroundings that the vosset 900 is expanding into.

In some embodiments, different manipulators (e.g., different directions) may cause different changes in the vosset 900. For example, one direction (e.g., up) may change the tree from a sapling to a full grown tree to a dead tree, as shown in FIGS. 8A-8C, where another direction (e.g., right) may change the tree between types of trees (e.g., from an evergreen to a deciduous to a bush).

Figure 10:
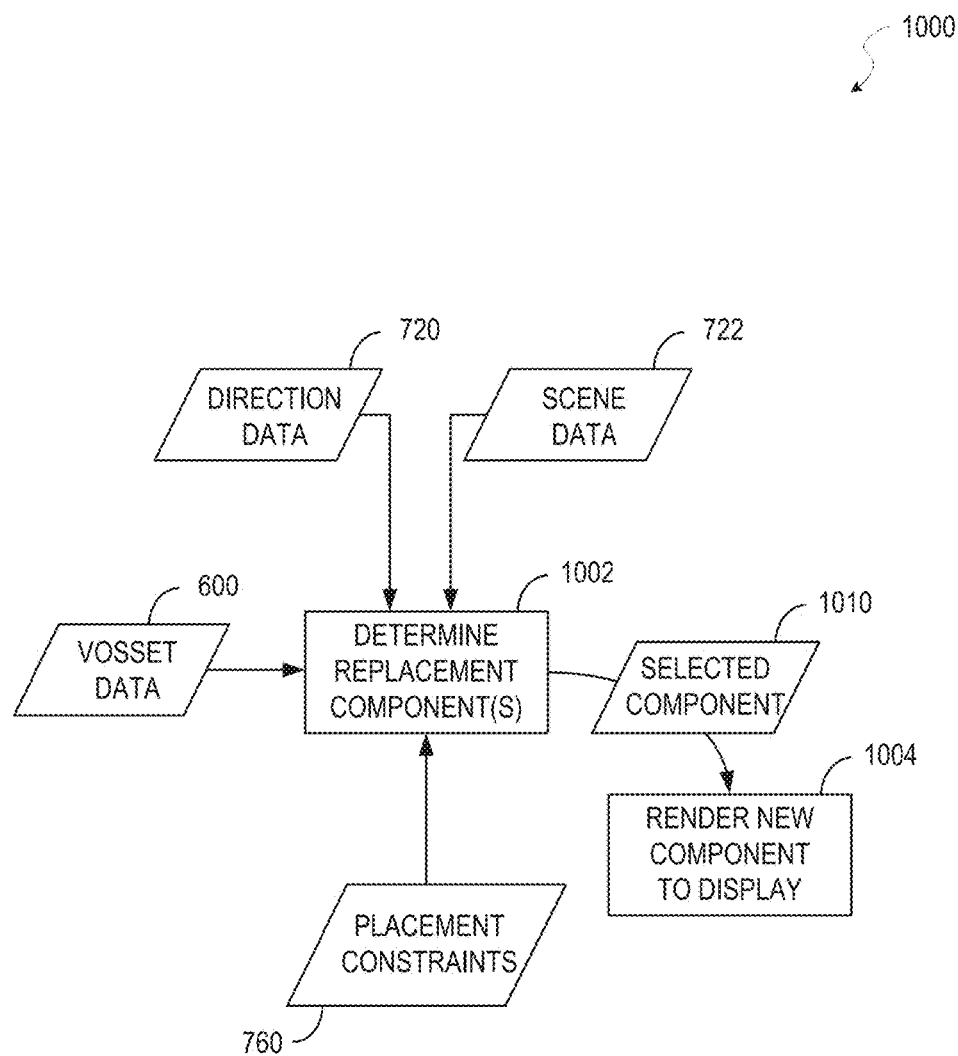
FIG. 10 illustrates an example flow chart including data and process flow for performing replacement expansion events on the vosset (e.g., as described and shown in FIG. 8A-8C)

FIG. 10 illustrates an example flow chart 1000 including data and process flow for performing replacement expansion events on the vosset 850 (e.g., as described and shown in FIG. 8A-8C). At operation 1002, the vosset module 310 determines which component(s) to replace in the vosset 850 (e.g., in response to the displacement of one of the manipulators 852). The vosset module 310 uses the vosset data 600, the direction data 720, the scene data 722, and any available placement constraints 760 for the placement of replacement components in order to make the determination of which component(s) to replace in the vosset 850.

The vosset data 600 may contain data for the replacement of 3D objects in the vosset 850 in one or more defined directions (e.g., one for the direction of each manipulator 852). For example, "Direction 1" direction element 602A may be the up direction shown in FIG. 8B, and a component set 604D for "Direction 1" may have data for three components, "component 4A" (e.g., the sapling of FIG. 8A), "Component 4B" (e.g., the full tree with leaves and apples of FIG. 8B), and "Component 4C" (e.g., the barren tree of FIG. 8C). The component set 604D includes 3D object data used to create, animate and render those 3D virtual objects. In some embodiments, components 606 for the various directions 602 or component sets 604 may be shared between components 606. For example, the example window vosset 900 shown in FIGS. 9A-9C may use the same direction components 606 for both right expansion and left expansion (e.g., the same extra window pane being added to the right or to the left).

At operation 1002, the vosset module 310 determines a "selected component" 1010 (e.g., one of the components 606 from the component set 604D). At operation 1004, the vosset module 310 replaces components of the current vosset 850 with the selected component(s) 1010, rendering the new vosset 850 with the replaced components, thereby displaying the expanded vosset 850 to the user 200.

In some embodiments, replacement events may be different depending on which manipulator on a vosset is displaced. For example, if a manipulator above the tree vosset is displaced in the vertical direction, the vosset may change into one type of object such as an evergreen tree. If a second manipulator on the same vosset is displaced in a different direction, the vosset could change into a different type of object, such as a bush. The vosset data 608 is used to configure the actions of the vosset, and is used during operation to determine how the vosset expands based on the displacements performed.

In some embodiments, the expansion or replacement elements for each object may be correlated with real world objects (e.g., from consumer stores and manufacturers). In such embodiments, the user 200 may be able to download and use elements from a consumer store or manufacturer giving them access to current consumer products. For example, a furniture manufacturer or store may produce vosset elements for living room furniture (e.g., expandable couch), kitchen appliances and counters (e.g., as shown in FIG. 4), shelving units, and the like. A restaurant or food producer may create vossets for food laid out on a table. A toy producer or store could produce vossets for toys on the ground or under the Christmas tree.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 11:
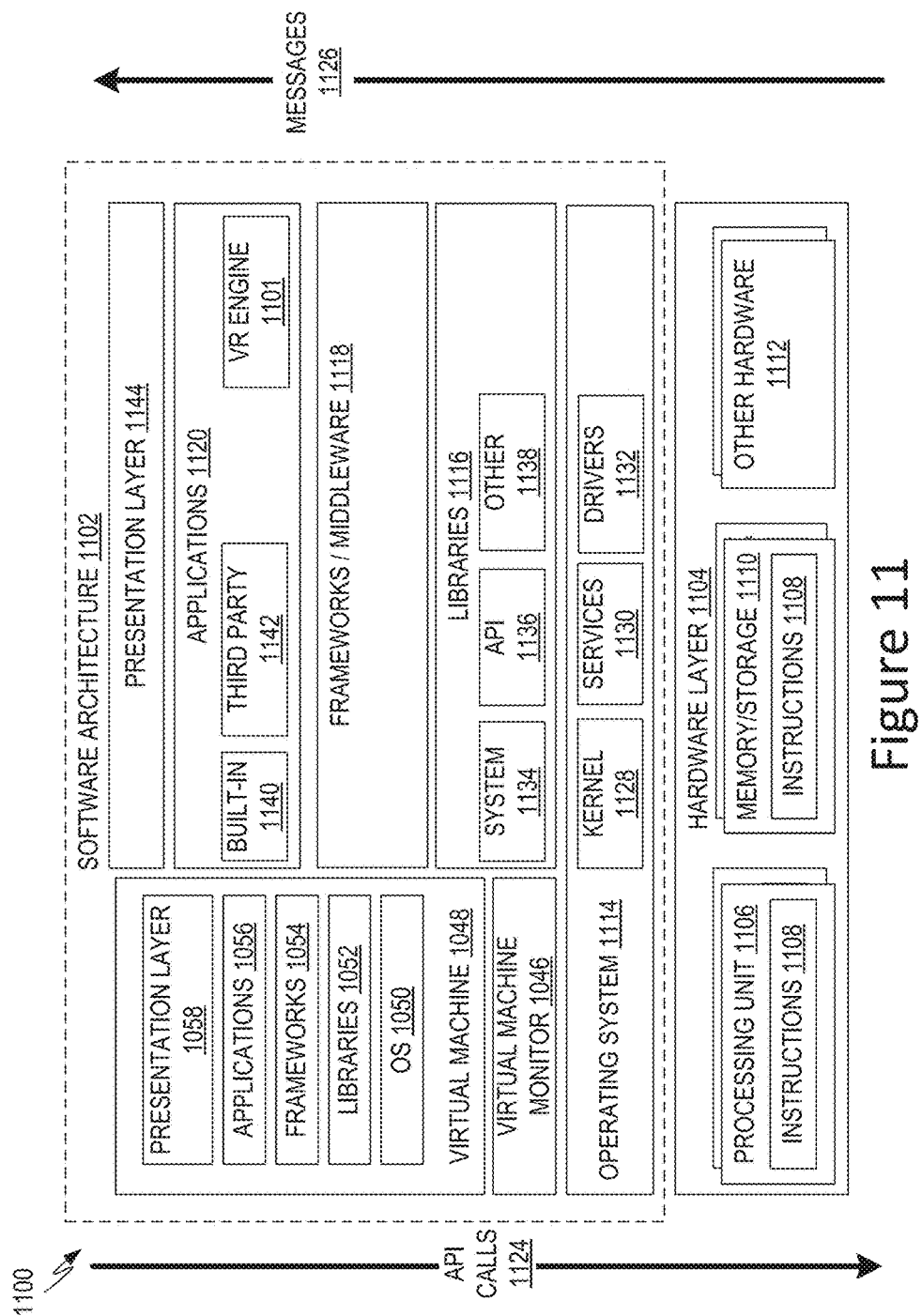
FIG. 11 is a block diagram illustrating an example software architecture, which may be used in conjunction with various hardware architectures herein described to provide a VR engine, which may be similar to the VR engine as described above.

FIG. 11 is a block diagram 1100 illustrating an example software architecture 1102, which may be used in conjunction with various hardware architectures herein described to provide a VR engine 1101, which may be similar to the VR engine 312 as described above. FIG. 11 is a non-limiting example of a software architecture and it will be appreciated that many other architectures may be implemented to facilitate the functionality described herein. The software architecture 1102 may execute on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 includes a processing unit 1106 having associated executable instructions 1108. The executable instructions 1108 represent the executable instructions of the software architecture 1102, including implementation of the methods, modules and so forth described herein. The hardware layer 1104 also includes memory/storage 1110, which also includes the executable instructions 1108. The hardware layer 1104 may also comprise other hardware 1112.

In the example architecture of FIG. 11, the software architecture 1102 may be conceptualized as a stack of layers where each layer provides particular functionality. For example, the software architecture 1102 may include layers such as an operating system 1114, libraries 1116, frameworks or middleware 1118, applications 1120 and a presentation layer 1144. Operationally, the applications 1120 and/or other components within the layers may invoke application programming interface (API) calls 1124 through the software stack and receive a response as messages 1126. The layers illustrated are representative in nature and not all software architectures have all layers. For example, some mobile or special purpose operating systems may not provide the frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be used by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) provide a higher-level common infrastructure that may be used by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1142 may invoke the API calls 1124 provided by the mobile operating system such as operating system 1114 to facilitate functionality described herein.

The applications 1120 may use built-in operating system functions (e.g., kernel 1128, services 1130 and/or drivers 1132), libraries 1116, or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Figure 12:
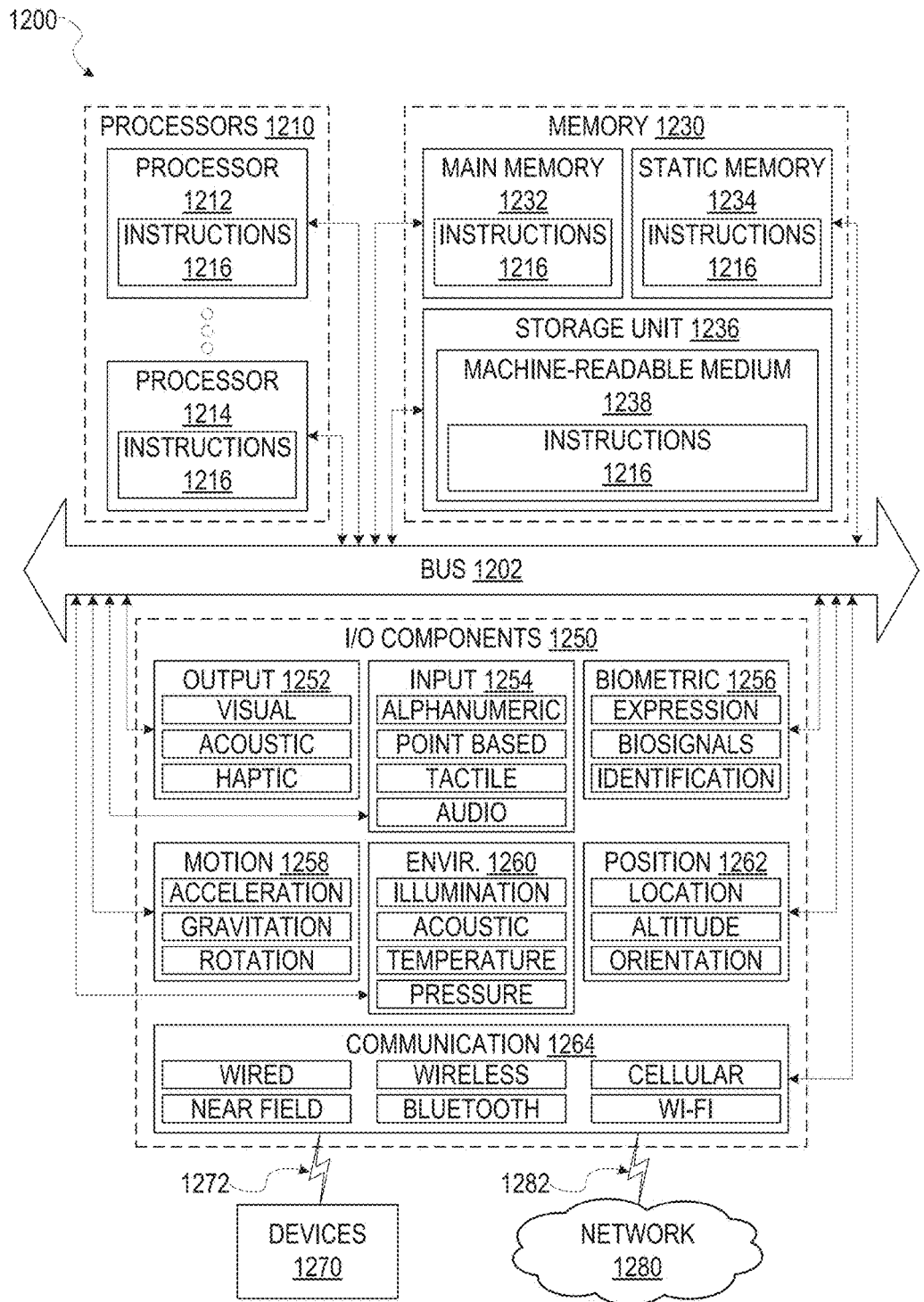
FIG. 12 is a block diagram illustrating components of a machine, according to some example embodiments, configured to read instructions from a machine-readable medium (e.g., a machine-readable storage medium) and perform any one or more of the methodologies discussed herein.

Some software architectures use virtual machines. In the example of FIG. 12, this is illustrated by a virtual machine 1148. The virtual machine 1148 creates a software environment where applications/modules can execute as if they were executing on a hardware machine (such as the machine 1200 of FIG. 12, for example). The virtual machine 1148 is hosted by a host operating system (e.g., operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system (OS) 1150, libraries 1152, frameworks 1154, applications 1156, and/or a presentation layer 1158. These layers of software architecture executing within the virtual machine 1148 can be the same as corresponding layers previously described or may be different.

FIG. 12 is a block diagram illustrating components of a machine 1200, according to some example embodiments, configured to read instructions from a machine-readable medium (e.g., a machine-readable storage medium) and perform any one or more of the methodologies discussed herein. In some embodiments, the machine 110 is similar to the HMD 102 or the VR interaction device 202 shown in FIGS. 1-10. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. As such, the instructions 1216 may be used to implement modules or components described herein. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines that individually or jointly execute the instructions 1316 to perform any one or more of the methodologies discussed herein.

The machine 1200 may include processors 1210, memory 1230, and input/output (I/O) components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that may execute the instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory/storage 1230 may include a memory, such as a main memory 1232, a static memory 1234, or other memory, and a storage unit 1236, both accessible to the processors 1210 such as via the bus 1202. The storage unit 1236 and memory 1232, 1234 store the instructions 1316 embodying any one or more of the methodologies or functions described herein. The instructions 1216 may also reside, completely or partially, within the memory 1232, 1234, within the storage unit 1236, within at least one of the processors 1210 (e.g., within the processor's cache memory), or any suitable combination thereof, during execution thereof by the machine 1200. Accordingly, the memory 1232, 1234, the storage unit 1236, and the memory of processors 1310 are examples of machine-readable media 1238.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1250 may include a wide variety of components to receive input, provide output, produce output, transmit information, exchange information, capture measurements, and so on. The specific input/output (I/O) components 1350 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1250 may include many other components that are not shown in FIG. 12. The input/output (I/O) components 1250 are grouped according to functionality merely for simplifying the following discussion and the grouping is in no way limiting. In various example embodiments, the input/output (I/O) components 1250 may include output components 1252 and input components 1254. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1250 may include communication components 1264 operable to couple the machine 1200 to a network 1280 or devices 1270 via a coupling 1282 and a coupling 1272 respectively. For example, the communication components 1264 may include a network interface component or other suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1262, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
one or more hardware processors;
one or more memories storing vosset data for a virtual object, the vosset data including a first displacement threshold and a first virtual object component associated with the virtual object, the first displacement threshold associated with a first direction of displacement; and
the one or more memories also storing a vosset module, executable by the one or more hardware processors, and configured to perform operations comprising:
including the first virtual object component for presentation as part of the virtual object in a three-dimensional virtual environment;
displaying a manipulator object adjacent to the virtual object in the three-dimensional virtual environment, the manipulator object identifying the first direction of displacement;
detecting a displacement event associated with the manipulator object, the displacement event being initiated by the user performing a grab event on the manipulator object and extending the manipulator object a displacement distance in the first direction of displacement;
determining that the displacement distance exceeds a displacement threshold;
capturing scene data in the three-dimensional virtual environment in the direction of the displacement; and
altering the virtual object based on the determining that the displacement distance exceeds the displacement threshold, the altering including analyzing the scene data and performing one of a modular expansion operation or a replacement expansion operation on the virtual object based on a selected mode of expansion, the modular expansion operation or the replacement expansion operation causing a second virtual object component to be included for presentation as an additional part of the virtual object in the three-dimensional virtual environment.

2. The system of claim 1, wherein the performing of the modular expansion operation includes merging the second virtual object component with the first virtual object for presentation as combined parts of the virtual object in the three-dimensional virtual environment such that the second virtual object component is attached to the first virtual object component in the first direction of the displacement, the second virtual object component being of a same object theme type as the first virtual object component.

3. The system of claim 2, the operations further comprising selecting the second virtual object component from a set of virtual object components associated with the first direction of displacement based on the scene data.

4. The system of claim 3, wherein selecting of the second virtual object component is further based at least in part on placement constraints associated with adding the second virtual object component to the three-dimensional virtual environment.

5. The system of claim 1, wherein the performing of the replacement expansion operation includes changing the first virtual object component to a second virtual object component associated with the virtual object, the second virtual object component being of a same object theme type as the first virtual object component, and using the scene data to influence selection of the second virtual object component.

6. The system of claim 1, the operations further comprising:
identifying one or more pre-configured manipulators associated with the virtual object, each of the one or more pre-configured manipulators including an associated displacement direction; and
displaying the one or more manipulator objects in the three-dimensional virtual environment, each of the one or more manipulator objects being displayed in the three-dimensional virtual environment adjacent to the virtual object based on the associated displacement direction.

7. The system of claim 1, wherein the three-dimensional environment is visually overlaid on a view of the real world via a display device.

8. The system of claim 1, wherein the user performs the grab event on the manipulator object from within the three-dimensional virtual environment and wherein the including of the second virtual object comprises editing the three-dimensional virtual environment such that the second virtual object component fills a space in the three-dimensional virtual environment for experiencing via a virtual reality interaction device.

9. A computer-implemented method comprising:
including a first virtual object component associated with a virtual object for presentation as part of the virtual object in a three-dimensional virtual environment, the virtual object associated with a first displacement threshold, the first displacement threshold associated with a first direction of displacement;
displaying a manipulator object adjacent to the virtual object in the three-dimensional virtual environment, the manipulator object identifying the first direction of displacement;
detecting a displacement event associated with the manipulator object, the displacement event being initiated by the user performing a grab event on the manipulator object and extending the manipulator object a displacement distance in the direction of displacement;
determining that the displacement distance exceeds a displacement threshold;
capturing scene data in the three-dimensional virtual environment in the direction of the displacement; and
altering the virtual object based on detecting the determining that the displacement distance exceeds the displacement threshold, the altering including analyzing the scene data and performing one of a modular expansion operation or a replacement expansion operation on the virtual object based on a selected mode of expansion, the modular expansion operation or the replacement expansion operation causing a second virtual object component to be included for presentation as an additional part of the virtual object in the three-dimensional virtual environment.

10. The method of claim 9, wherein the performing of the modular expansion operation includes merging the second virtual object component with the first virtual object for presentation as combined parts of the virtual object in the three-dimensional virtual environment such that the second virtual object component is attached to the first virtual object component in the first direction of the displacement, the second virtual object component being of a same object theme type as the first virtual object component.

11. The method of claim 10, further comprising selecting the second virtual object component from a set of virtual object components associated with the first direction of replacement based on the scene data.

12. The method of claim 11, wherein selecting of the second virtual object component is further based at least in part on placement constraints associated with adding the second virtual object component to the three-dimensional virtual environment.

13. The method of claim 11, wherein selecting of the second virtual object component is either random or based at least in part on an order associated with each of the set of virtual object components.

14. The method of claim 9, wherein the performing of the replacement expansion operation includes changing the first virtual object component to a second virtual object component associated with the virtual object, the second virtual object component being of a same object theme type as the first virtual object component, and using the scene data to influence selection of the second virtual object component.

15. The method of claim 9, further comprising:
identifying one or more pre-configured manipulators associated with the virtual object, each of the one or more pre-configured manipulators including an associated displacement direction; and
displaying the one or more manipulator objects in the three-dimensional virtual environment, each of the one or more manipulator objects being displayed in the three-dimensional virtual environment adjacent to the virtual object based on the associated displacement direction.

16. A non-transitory machine-readable medium storing processor-executable instructions which, when executed by a processor, cause the processor to perform operations comprising:
including a first virtual object component associated with a virtual object for presentation as part of the virtual object in a three-dimensional virtual environment, the virtual object associated with a first displacement threshold, the first displacement threshold associated with a first direction of displacement;
displaying a manipulator object adjacent to the virtual object in the three-dimensional virtual environment, the manipulator object identifying the first direction of displacement;
detecting a displacement event associated with the manipulator object, the displacement event being initiated by the user performing a grab event on the manipulator object and extending the manipulator object a displacement distance in the direction of displacement;
determining that the displacement distance exceeds a displacement threshold;

capturing scene data in the three-dimensional virtual environment in the direction of the displacement; and altering the virtual object based on detecting the determining that the displacement distance exceeds the displacement threshold, the altering including analyzing the scene data and performing one of a modular expansion operation or a replacement expansion operation on the virtual object based on a selected mode of expansion, the modular expansion operation or the replacement expansion operation causing a second virtual object component to be included for presentation as an additional part of the virtual object in the three-dimensional virtual environment.

17. The non-transitory machine-readable medium of claim 16, wherein the performing of the modular expansion operation includes merging the second virtual object component with the first virtual object for presentation as combined parts of the virtual object in the three-dimensional virtual environment such that the second virtual object component is attached to the first virtual object component in the first direction of the displacement, the second virtual object component being of a same object theme type as the first virtual object component.

18. The non-transitory machine-readable medium of claim 17, the operations further comprising selecting the second virtual object component from a set of virtual object components associated with the first direction of displacement based on the scene data.

19. The non-transitory machine-readable medium of claim 18, wherein selecting of the second virtual object component is further based at least in part on placement constraints associated with adding the second virtual object component to the three-dimensional virtual environment.

20. The non-transitory machine-readable medium of claim 16, wherein the performing of the replacement expansion operation includes changing the first virtual object component to a second virtual object component associated with the virtual object, the second virtual object component being of a same object theme type as the first virtual object component, and using the scene data to influence selection of the second virtual object component.

21. The non-transitory machine-readable medium of claim 16, the operations further comprising:
    identifying one or more pre-configured manipulators associated with the virtual object, each of the one or more pre-configured manipulators including an associated displacement direction; and
    displaying the one or more manipulator objects in the three-dimensional virtual environment, each of the one or more manipulator objects being displayed in the three-dimensional virtual environment adjacent to the virtual object based on the associated displacement direction.

* * * * *